US008760414B2

(12) United States Patent
Kim

(10) Patent No.: US 8,760,414 B2
(45) Date of Patent: Jun. 24, 2014

(54) MOBILE TERMINAL

(75) Inventor: Hyung-Il Kim, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 958 days.

(21) Appl. No.: 12/718,943

(22) Filed: Mar. 5, 2010

(65) Prior Publication Data

US 2011/0009169 A1  Jan. 13, 2011

(30) Foreign Application Priority Data

Jul. 13, 2009  (KR) .................. 10-2009-0063689

(51) Int. Cl.
    G06F 3/041  (2006.01)
(52) U.S. Cl.
    USPC ............ 345/173; 345/172; 345/169; 345/1.1; 455/466; 455/575.4; 455/566
(58) Field of Classification Search
    USPC .................. 379/428.01–428.04, 433.01; 361/679.01; 345/172–174, 168–169, 345/1.1; 455/575.4, 566, 466; 715/816
    See application file for complete search history.

(56) References Cited

U.S. PATENT DOCUMENTS

| 5,768,552 | A | * | 6/1998 | Jacoby | 345/441 |
| 6,055,153 | A | * | 4/2000 | Chiu et al. | 361/679.14 |
| 6,748,249 | B1 | * | 6/2004 | Eromaki et al. | 455/575.4 |
| 7,252,511 | B2 | * | 8/2007 | Santos et al. | 439/10 |
| 7,269,450 | B2 | * | 9/2007 | Lee et al. | 455/575.1 |
| 7,283,847 | B2 | * | 10/2007 | Kim | 455/566 |
| D559,222 | S | * | 1/2008 | Chen | D14/138 AA |
| 7,330,548 | B2 | * | 2/2008 | Kim et al. | 379/433.12 |
| 7,397,658 | B2 | * | 7/2008 | Finke-Anlauff et al. | 361/679.55 |
| 7,539,011 | B2 | * | 5/2009 | Shih et al. | 361/679.26 |
| 7,580,726 | B2 | * | 8/2009 | Maatta et al. | 455/550.1 |
| 7,636,591 | B2 | * | 12/2009 | Kim et al. | 455/575.4 |
| 7,656,662 | B2 | * | 2/2010 | Chen | 361/679.55 |
| 7,697,270 | B2 | * | 4/2010 | Chen | 361/679.05 |
| 7,760,510 | B2 | * | 7/2010 | Tsai et al. | 361/727 |
| 7,768,503 | B2 | * | 8/2010 | Chiu et al. | 345/173 |
| 7,912,706 | B2 | * | 3/2011 | Sparre | 704/10 |
| 8,023,975 | B2 | * | 9/2011 | Wickman et al. | 455/466 |
| 8,033,744 | B2 | * | 10/2011 | Baker | 400/486 |
| 8,064,973 | B2 | * | 11/2011 | Vesamaki et al. | 455/575.4 |
| 8,108,016 | B2 | * | 1/2012 | Gaddy | 455/575.4 |
| 8,244,319 | B2 | * | 8/2012 | Paschke et al. | 455/575.4 |
| 2002/0118175 | A1 | * | 8/2002 | Liebenow et al. | 345/168 |

(Continued)

FOREIGN PATENT DOCUMENTS

| EP | 1 981 250 A2 | 10/2008 |
| WO | WO 2004/053673 A2 | 6/2004 |

Primary Examiner — Lun-Yi Lao
Assistant Examiner — Kelly B Hegarty
(74) Attorney, Agent, or Firm — Birch, Stewart, Kolasch & Birch, LLP

(57) ABSTRACT

A mobile terminal including a first body, a second body slidably coupled with the first body such that the second body is slidably moved in a widthwise direction to implement an opened and closed configuration with respect to the first body, first and second keypads disposed separately on a front surface of the second body, a display disposed on a front surface of the first body and configured to display content input through manipulation of the first or second keypads, and a touch screen disposed between the first and second keypads and being linked with the first and second keypads so as to display information that can be input and displayed on the display and that is not included on the first or second keypads.

19 Claims, 22 Drawing Sheets

(56) References Cited

U.S. PATENT DOCUMENTS

| | | | |
|---|---|---|---|
| 2003/0038786 A1* | 2/2003 | Nguyen et al. | 345/169 |
| 2003/0103041 A1* | 6/2003 | Nguyen et al. | 345/168 |
| 2004/0196270 A1* | 10/2004 | Chiu et al. | 345/174 |
| 2004/0263533 A1* | 12/2004 | Yamamoto et al. | 345/619 |
| 2005/0054393 A1* | 3/2005 | Fagerstrom et al. | 455/575.1 |
| 2005/0111172 A1* | 5/2005 | Wang | 361/680 |
| 2005/0245251 A1* | 11/2005 | Lee et al. | 455/422.1 |
| 2006/0056141 A1* | 3/2006 | Pihlaja et al. | 361/683 |
| 2006/0073859 A1* | 4/2006 | Chou | 455/575.4 |
| 2006/0104013 A1* | 5/2006 | Sakakibara et al. | 361/680 |
| 2006/0135229 A1* | 6/2006 | Kwak et al. | 455/575.4 |
| 2006/0265668 A1* | 11/2006 | Rainisto | 715/816 |
| 2007/0123322 A1* | 5/2007 | Mizushina | 455/575.1 |
| 2007/0254730 A1* | 11/2007 | Kim et al. | 455/575.4 |
| 2007/0260981 A1* | 11/2007 | Kim et al. | 715/531 |
| 2007/0268317 A1* | 11/2007 | Banay | 345/660 |
| 2007/0287512 A1* | 12/2007 | Kilpi et al. | 455/575.1 |
| 2008/0014787 A1* | 1/2008 | Kim et al. | 439/517 |
| 2008/0024453 A1* | 1/2008 | Webb et al. | 345/169 |
| 2008/0070650 A1* | 3/2008 | Kim et al. | 455/575.4 |
| 2008/0260295 A1* | 10/2008 | Marriott et al. | 382/305 |
| 2008/0266261 A1* | 10/2008 | Idzik | 345/168 |
| 2009/0024926 A1* | 1/2009 | Morotomi | 715/716 |
| 2009/0163257 A1* | 6/2009 | Vesamaki et al. | 455/575.4 |
| 2009/0167783 A1* | 7/2009 | Fujinaga | 345/619 |
| 2009/0244019 A1* | 10/2009 | Choi | 345/173 |
| 2009/0251422 A1* | 10/2009 | Wu et al. | 345/173 |
| 2010/0054715 A1* | 3/2010 | Marriott et al. | 386/124 |
| 2010/0097321 A1* | 4/2010 | Son et al. | 345/169 |
| 2010/0141484 A1* | 6/2010 | Griffin et al. | 341/22 |
| 2010/0159984 A1* | 6/2010 | Nguyen et al. | 455/556.1 |
| 2010/0245252 A1* | 9/2010 | Ghassabian | 345/169 |
| 2010/0277414 A1* | 11/2010 | Tartz et al. | 345/169 |
| 2010/0283743 A1* | 11/2010 | Coddington | 345/173 |
| 2011/0009169 A1* | 1/2011 | Kim | 455/566 |
| 2011/0047459 A1* | 2/2011 | Van Der Westhuizen | 715/702 |
| 2011/0124376 A1* | 5/2011 | Kim et al. | 455/566 |
| 2011/0154246 A1* | 6/2011 | Oh et al. | 715/773 |
| 2011/0242739 A1* | 10/2011 | Shen | 361/679.01 |
| 2011/0267743 A1* | 11/2011 | Shen | 361/679.01 |
| 2012/0094725 A1* | 4/2012 | Matsumoto | 455/566 |
| 2012/0113007 A1* | 5/2012 | Koch et al. | 345/168 |
| 2012/0117506 A1* | 5/2012 | Koch et al. | 715/773 |
| 2012/0173732 A1* | 7/2012 | Sullivan | 709/226 |
| 2012/0188174 A1* | 7/2012 | Migos et al. | 345/173 |
| 2012/0242684 A1* | 9/2012 | Kim | 345/619 |
| 2012/0262887 A1* | 10/2012 | Park et al. | 361/749 |

* cited by examiner

MOBILE TERMINAL

CROSS REFERENCE TO A RELATED APPLICATION

The present application claims priority to Korean Application No. 10-2009-0063689 filed in Korea on Jul. 13, 2009, the entire contents of which is hereby incorporated by reference in its entirety.

BACKGROUND OF THE INVENTION

1. Field of the Invention

The present invention relates to a mobile terminal having multiple displays.

2. Description of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. In addition, mobile terminals can also receive broadcast and multicast signals, which permit viewing of content such as videos and television programs.

Efforts are ongoing to support and increase the functionality of mobile terminals. Such efforts include software and hardware improvements, as well as changes and improvements in the structural components which form the mobile terminal. However, because the display is small in size, it is difficult to display the needed user interface.

SUMMARY OF THE INVENTION

Accordingly, one object of the present invention is to provide a mobile terminal allowing information to be easily input and output making the user interface more convenient to the user.

To achieve these and other advantages and in accordance with the purpose of the present invention, as embodied and broadly described herein, the present invention provides in one aspect a mobile terminal including a first body, a second body slidably coupled with the first body such that the second body is slidably moved in a widthwise direction to implement an opened and closed configuration with respect to the first body, first and second keypads disposed separately on a front surface of the second body, a display disposed on a front surface of the first body and configured to display content input through manipulation of the first or second keypads, and a touch screen disposed between the first and second keypads and being linked with the first and second keypads so as to display information that can be input and displayed on the display and that is not included on the first or second keypads.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

The mobile terminal according to exemplary embodiments of the present invention will now be described with reference to the accompanying drawings.

Mobile terminals may be implemented in various forms. For example, the terminal described in the present invention may include mobile terminals such as mobile phones, smart phones, notebook computers, digital broadcast receivers, PDAs (Personal Digital Assistants), PMPs (Portable Multimedia Player), navigation devices, and the like, and fixed terminals such as digital TVs, desk top computers and the like. Hereinafter, it is assumed that the terminal is a mobile terminal. However, the configuration according to the embodiments of the present invention can be also applicable to the fixed types of terminals.

Reference will now be made in detail to the preferred embodiments of the present invention, examples of which are illustrated in the accompanying drawings. A mobile terminal may be implemented using a variety of different types of terminals. Examples of such terminals include mobile phones, smart phones, notebook computers, digital broadcast terminals, Personal Digital Assistants (PDA), Portable Multimedia Players (PMP), navigators and the like.

Figure 1:
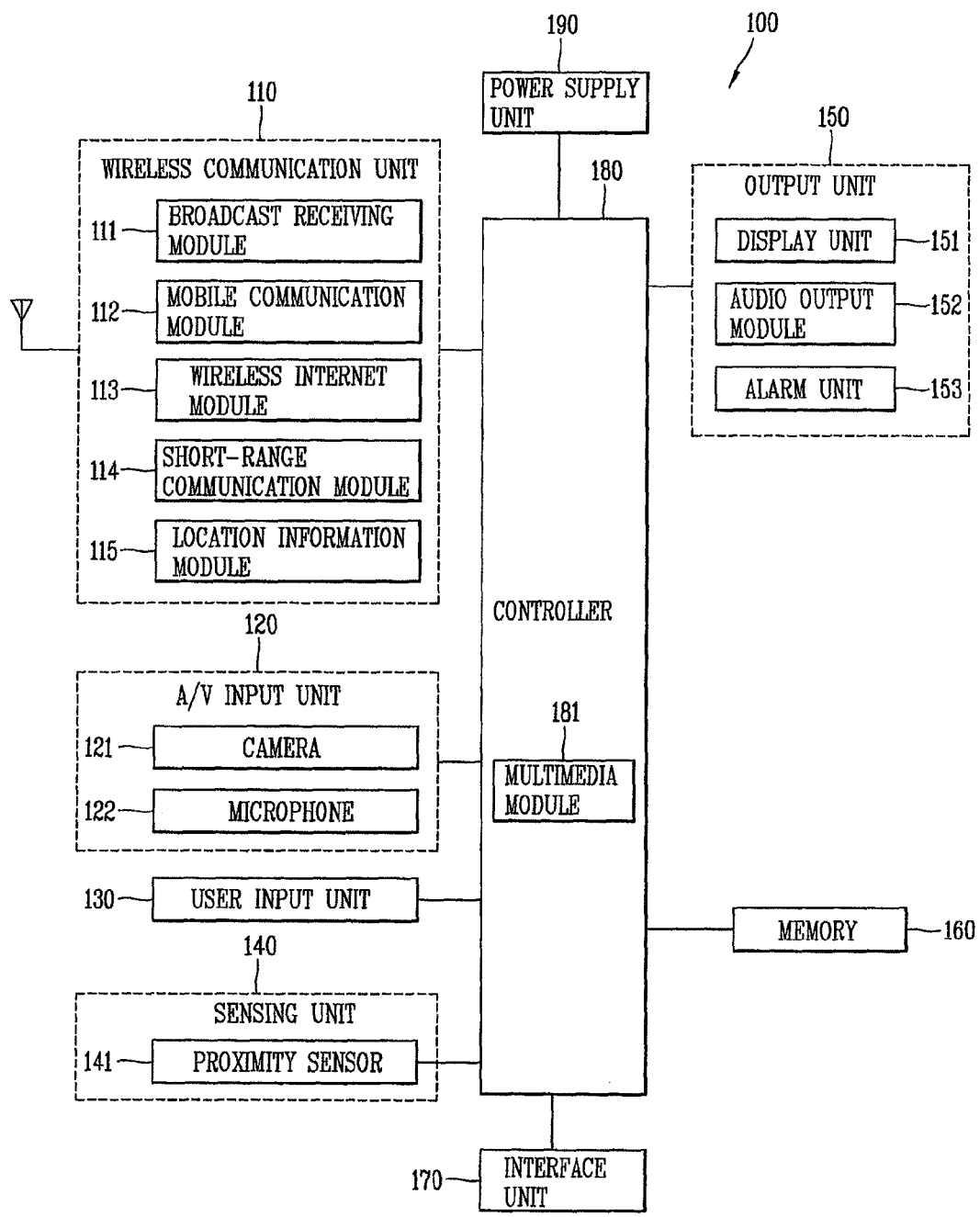
FIG. 1 is a front perspective view of a mobile terminal according to an embodiment of the present invention.

FIG. 1 is a block diagram illustrating a mobile terminal according to one embodiment of the present invention. As shown, the mobile terminal 100 may include components such as a wireless communication unit 110, an Audio/Video (A/V) input unit 120, a user input unit 130, a sensing unit 140, an output unit 150, a memory 160, an interface unit 170, a controller 180, a power supply 190 and the like. Further, FIG.

1 shows the mobile terminal 100 having various components, but it is understood that implementing all of the illustrated components is not a requirement. Greater or fewer components may alternatively be implemented.

In addition, the wireless communication unit 110 may include one or more components which permit wireless communications between the mobile terminal 100 and a wireless communication system or between the mobile terminal 100 and a network within which the mobile terminal 100 is located. For example, In FIG. 1, the wireless communication unit 110 includes a broadcast receiving module 111, a mobile communication module 112, a wireless Internet module 113, a short-range communication module 114 and a position location module 115.

The broadcast receiving module 111 receives a broadcast signal and/or broadcast associated information from an external broadcast managing entity via a broadcast channel. The broadcast channel may include a satellite channel and a terrestrial channel. Further, the broadcast managing entity corresponds to a server which generates and transmits a broadcast signal and/or broadcast associated information or a server which receives a pre-generated broadcast signal and/or broadcast associated information and sends the signal/information to the mobile terminal. Examples of broadcast associated information include information associated with a broadcast channel, a broadcast program, a broadcast service provider, and the like.

The broadcast signal may be implemented as a TV broadcast signal, a radio broadcast signal, and a data broadcast signal, among others. The broadcast signal may further include a data broadcast signal combined with a TV or radio broadcast signal. Also, the broadcast associated information may be provided via a mobile communication network, and received by the mobile communication module 112. In addition, the broadcast associated information may be implemented in various formats. For instance, broadcast associated information may include an Electronic Program Guide (EPG) of the Digital Multimedia Broadcasting (DMB) system, an Electronic Service Guide (ESG) of the Digital Video Broadcast-Handheld (DVB-H) system, and the like.

The broadcast receiving module 111 may be configured to receive digital broadcast signals transmitted from various types of broadcast systems. Such broadcast systems may include the Digital Multimedia Broadcasting-Terrestrial (DMB-T) system, the Digital Multimedia Broadcasting-Satellite (DMB-S) system, the Media Forward Link Only (MediaFLO) system, the Digital Video Broadcast-Handheld (DVB-H) system, the Integrated Services Digital Broadcast-Terrestrial (ISDB-T) system, and the like. The broadcast receiving module 111 may be configured to be suitable for all broadcast system transmitting broadcast signals as well as the digital broadcasting systems. Broadcast signals and/or broadcast associated information received via the broadcast receiving module 111 may also be stored in a suitable device, such as a memory 160.

Further, the mobile communication module 112 transmits/receives wireless signals to/from at least one of network entities (e.g., base station, an external mobile terminal, a server, etc.) on a mobile communication network. In addition, the wireless signals may include an audio call signal, video call signal, or various formats of data according to transmission/reception of text/multimedia messages. Also, the wireless Internet module 113 supports wireless Internet access for the mobile terminal, and may be internally or externally coupled to the mobile terminal. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

Further, the short-range communication module 114 denotes a module for short-range communications. Suitable technologies for implementing this module include BLUETOOTH, Radio Frequency IDentification (RFID), Infrared Data Association (IrDA), Ultra-WideBand (UWB), ZigBee, and the like. The position location module 115 denotes a module for detecting or calculating a position of a mobile terminal. An example of the position location module 115 includes a Global Position System (GPS) module.

In addition, the GPS module can receive position information in cooperation with associated multiple satellites. Further, the position information may include coordinates information represented by latitude and longitude. For example, the GPS module can measure accurate time and distance respectively from more than three satellites so as to accurately calculate a current position of the mobile terminal based on such three different distances according to a triangulation scheme. A scheme may be used to obtain time information and distance information from three satellites and correct error by one satellite. Specifically, the GPS module can further obtain three-dimensional speed information and an accurate time, as well as position on latitude, longitude and altitude, from the position information received from the satellites.

In addition, the A/V input unit 120 is configured to provide audio or video signal input to the mobile terminal. In FIG. 1, the A/V input unit 120 includes a camera 121 and a microphone 122. Further, the camera 121 receives and processes image frames of still pictures or video obtained by image sensors in a video call mode or a capturing mode. The processed image frames can then be displayed on a display unit 151 (hereinafter referred to as the display 151).

Also, the image frames processed by the camera 121 may be stored in the memory 160 or transmitted to the exterior via the wireless communication unit 110. Two or more cameras 121 can also be provided according to the configuration of the mobile terminal. The microphone 122 can receive an external audio signal via a microphone while the mobile terminal is in a particular mode such as a phone call mode, a recording mode, a voice recognition mode, or the like. The audio signal is then processed into digital data, and the processed digital data is converted for output into a format transmittable to a mobile communication base station via the mobile communication module 112 for the phone call mode. The microphone 122 may also include assorted noise removing algorithms to remove noise generated when receiving the external audio signal.

In addition, the user input unit 130 can generate input data input by a user to control the operation of the mobile terminal. The user input unit 130 may include a keypad, a dome switch, a touchpad (e.g., static pressure/capacitance), a jog wheel, a jog switch and the like. A specific example can be one in which the touchpad is layered with a display unit 151 (hereinafter, display 151) so as to be in cooperation with the display 151, which is referred to as a touch screen. Further, the sensing unit 140 provides status measurements of various aspects of the mobile terminal. For instance, the sensing unit 140 can detect an open/close status of the mobile terminal, a change in a location of the mobile terminal 100, a presence or absence of user contact with the mobile terminal 100, the location of the mobile terminal 100, an acceleration/deceleration of the mobile terminal 100, and the like, so as to generate a sensing signal for controlling the operation of the mobile terminal 100.

For example, regarding a slide-type mobile terminal, the sensing unit 140 can sense whether a sliding portion of the mobile terminal is opened or closed. Other examples include sensing functions such as the sensing unit 140 sensing the presence or absence of power provided by the power supply 190, the presence or absence of a coupling or other connection between the interface unit 170 and an external device. The sensing unit 140 also includes a proximity sensor 141.

In addition, the proximity sensor 141 can be located in an internal region of the mobile terminal 100, surrounded by the touch screen or near the touch screen. The proximity sensor 141 senses an object approaching a predetermined sensing face or an object located near the proximity sensor 141 using an electromagnetic force or infrared rays without having mechanical contact. Further, the proximity sensor 141 has a lifetime longer than that of a contact sensor and has wide applications. The proximity sensor 141 also includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc.

In addition, a capacitive touch screen is constructed such that a proximity of a pointer is detected through a variation in an electric field according to the proximity of the pointer. In this instance, the touch screen (touch sensor) can be classified as a proximity sensor. For convenience of explanation, an action of approaching the pointer to the touch screen while the pointer is not in contact with the touch screen such that the location of the pointer on the touch screen is recognized is referred to as a "proximity touch," and an action of bringing the pointer into contact with the touch screen is referred to as a "contact touch" in the following description. Also, a proximity touch point of the pointer on the touch screen means a point of the touch screen to which the pointer corresponds perpendicularly to the touch screen when the pointer proximity-touches the touch screen.

Further, the proximity sensor 141 senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can also be displayed on the touch screen.

In addition, the interface unit 170 is generally implemented to couple the mobile terminal to external devices. The interface unit 170 may include, for example, wired/wireless headset ports, external charger ports, wired/wireless data ports, memory card ports, ports for coupling devices having an identification module, etc.), audio Input/Output (I/O) ports, video I/O ports, earphone ports, and the like. The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

In addition, the interface unit 170 can receive data from an external device, or be provided with power and accordingly transfer the received data or power to each component within the mobile terminal 100 or transfer data of the mobile terminal 100 to an external device. Also, the interface unit 170 can serve as a path for power to be supplied from an external cradle to the mobile terminal 100 when the mobile terminal 100 is connected to the external cradle or as a path for transferring various command signals input from the cradle by a user to the mobile terminal 100. Such various command signals and power input from the cradle may operate as a signal for recognizing that the mobile terminal 100 has accurately been mounted to the cradle.

The output unit 150 is configured to output an audio signal, a video signal or an alarm signal, and in FIG. 1 includes the display 151, an audio output module 152, an alarm 153, and the like. Further, the display 151 can output information processed in the mobile terminal 100. For example, when the mobile terminal is operating in a phone call mode, the display 151 provides a User Interface (UI) or a Graphic User Interface (GUI) which includes information associated with the call. As another example, if the mobile terminal is in a video call mode or a capturing mode, the display 151 may additionally or alternatively display images captured and/or received, UI, or GUI.

Meanwhile, as mentioned above, a touch screen can be configured when the display 151 and the touchpad are layered with each other to work in cooperation with each other. This configuration permits the display 151 to function both as an input device and an output device. The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays according to embodiments of the present invention can be configured to be transparent such that it is possible to see the exterior therethrough. These displays may be called transparent displays. A representative example of the transparent display includes a Transparent Organic Light Emitting Diode (TOLED), and the like. Further, the mobile terminal 100 may include two or more of such displays 151. For example, the mobile terminal 100 may simultaneously include an external display and an internal display.

Further, the audio output module 152 can output audio data which is received from the wireless communication unit 110 in various modes including a call-receiving mode, call-placing mode, recording mode, voice recognition mode, broadcast reception mode, and the like, or audio data stored in the memory 160. Also, the audio output module 152 can output an audio signal relating to a particular function (e.g., call received, message received, etc.) performed in the mobile terminal 100. The audio output module 152 may be implemented using a speaker, a buzzer, or the like.

In addition, the alarm 153 can output a signal to inform a generation of event associated with the mobile terminal 100. Alarm events include a call received, message received, user input received and the like. In addition to generating the audio or video signal, the alarm 153 can also inform the event generation in different manners, for example, by providing tactile sensations (e.g., vibration) to a user. The alarm 153 can also be configured to vibrate responsive to the mobile terminal receiving a call or message. As another example, vibration is provided by the alarm 153 responsive to receiving user input at the mobile terminal, thus providing a tactile feedback mechanism. Such vibration can also be provided to make a user recognize the event generation. The signal informing the event generation may be output via the display 151 or the audio output module 152.

Further, the memory 160 can store a program for the processing and control of the controller 180. Alternatively, the memory 160 can temporarily store input/output data (e.g., phonebook data, messages, still images, video and the like). Also, the memory 160 can store data related to various patterns of vibrations and audio outputted upon the touch input on the touch screen. In addition, the memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the mobile terminal 100 may operate a web storage which performs the storage function of the memory 160 on the Internet.

In addition, the controller 180 generally controls the overall operations of the mobile terminal. For example, the controller 180 performs the control and processing associated with voice calls, data communications, video calls, and the like. The controller 180 also includes a multimedia module 181 which provides multimedia playback. The multimedia module 181 may be configured as part of the controller 180 or as a separate component. The controller 180 can also perform a pattern recognition processing so as to recognize writing or drawing input on the touch screen as text or image. Further, the power supply 190 provides power required by various components under the control of the controller 180. The provided power may be internal power, external power, or combination thereof.

Various embodiments described herein may be implemented in a computer-readable medium using, for example, software, hardware, or some combination thereof. For a hardware implementation, the embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some instances, such embodiments are implemented by the controller 180.

For a software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

The internal components of the mobile terminal related to an embodiment of the present invention have been described from the perspective of their functions. Hereinafter, external components of the mobile terminal related to an embodiment of the present invention will be described from the perspective of their functions with reference to FIGS. 2A to 2C.

Figure 2A:
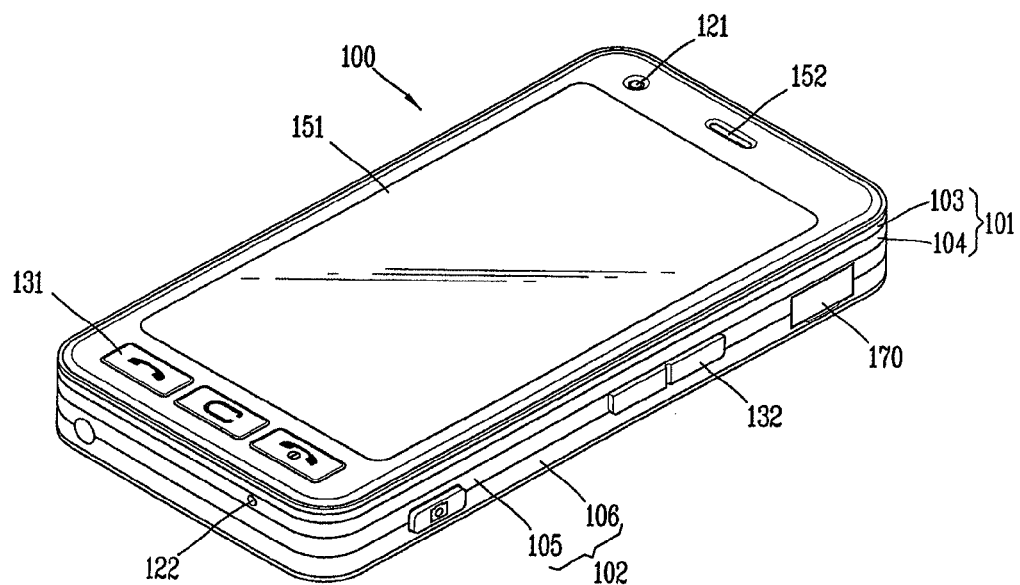
FIG. 2A is an overview illustrating an external appearance of the mobile terminal in a closed configuration according to an embodiment of the present invention.
Figure 2B:
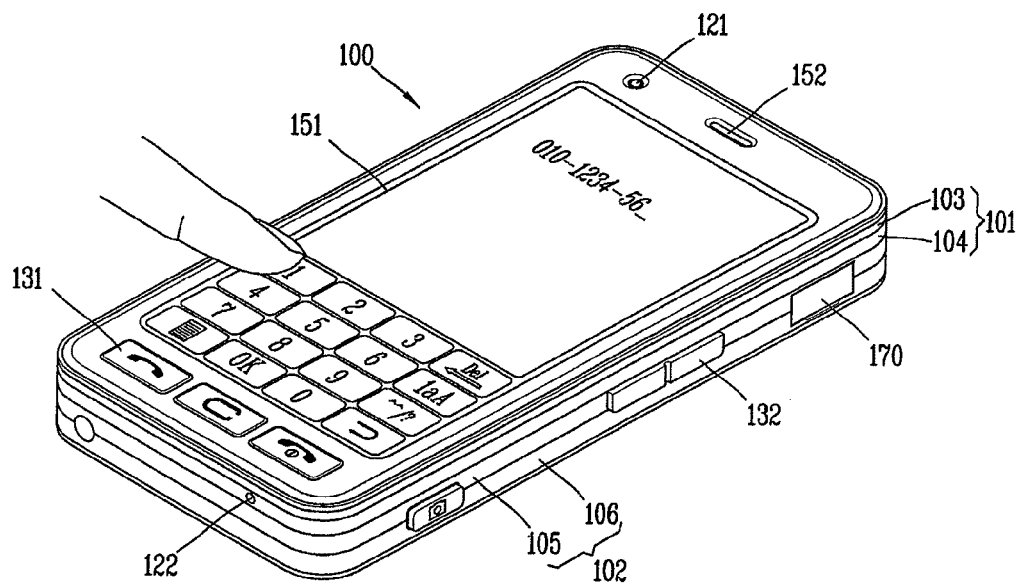
FIG. 2B is an overview illustrating an operational state in which a first touch screen is used in the closed configuration of the mobile terminal of FIG. 2A.
Figure 2C:
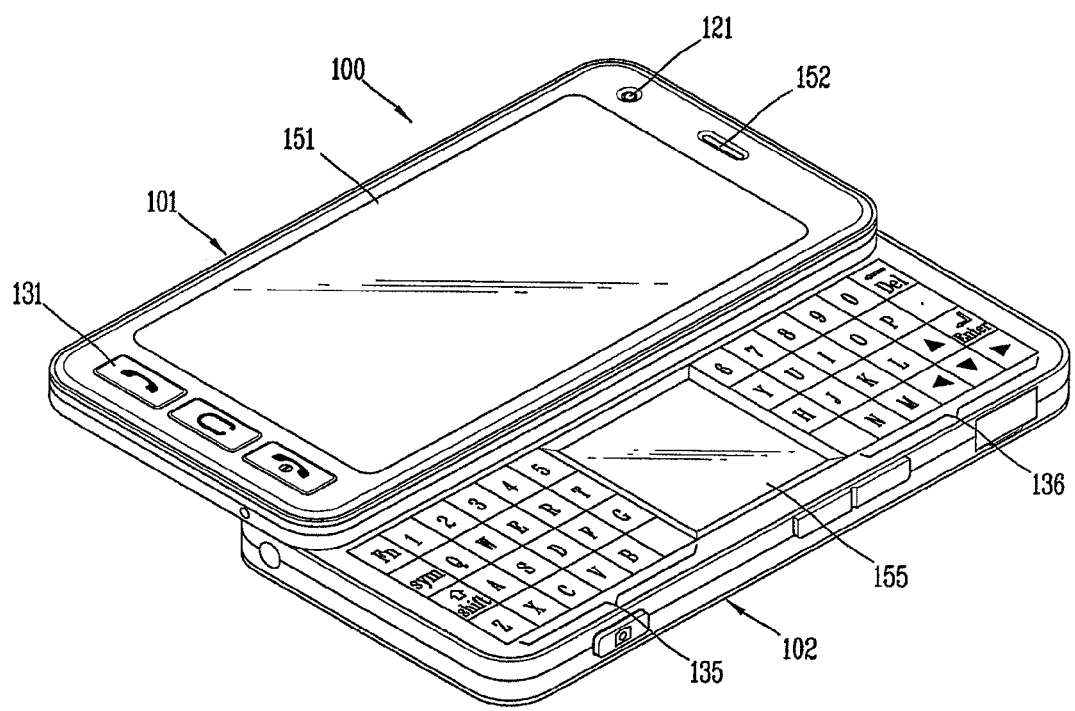
FIG. 2C is a front perspective view of the mobile terminal in an opened configuration.

In particular, FIG. 2A illustrates the mobile terminal in a closed configuration, FIG. 2B illustrates a user using a first touch screen in the closed configuration of the mobile terminal of FIG. 2A, and FIG. 2C illustrates the mobile terminal in an opened configuration. As shown in these drawings, the mobile terminal 100 includes a front body 101 and a rear body 102 slidably coupled with each other such that the bodies can be slidably moved with respect to each other in a widthwise direction (i.e., horizontal direction).

Further, the front body 101 is disposed to overlap with the rear body 102. Also, FIG. 2C illustrates a state in which a particular portion of the rear body 102 is exposed and this is referred to as an opened configuration. FIG. 2A illustrates a state in which the particular portion is covered by the front body 101 and this is referred to as a closed configuration. Further, besides the opened configuration shown in FIG. 2C, the upper surface of the front body 101 and that of the rear body 102 may be configured such that they are smoothly slid without a step. In particular, the front body 101 may be placed down in a recess formed at the rear body 102 in the opened configuration or may be configured to be tilted upwards at a particular angle.

In addition, the case (casing, housing, cover, etc.) constituting the external appearance of the front body 101 includes a front case 103 and a rear case 104. Various electronic components are also installed in the space between the front case 103 and the rear case 104. Further, the cases 103 and 104 may be formed by injection-molding a synthetic resin or may be made of a metallic material such as stainless steel (STS) or titanium (Ti), etc. Also, the rear body 102 includes a front case 105 and the rear case 106.

As discussed above, FIG. 2A shows an external appearance of a bar shape mobile terminal 100 in the closed configuration. The front or side of the front body 101 includes elements for performing inputting or outputting operations to allow the user to execute various functions (e.g., a call, a message transmission, a multimedia function, etc.) even when the mobile terminal 100 is in the closed configuration. For example, as shown in FIG. 2A, the first touch screen 151 (the display 151 in FIG. 1), the audio output unit 152, the image input unit 121 (the camera 121 in FIG. 1), an external key 131, the audio input unit 122, microphone 121, and the like, are disposed on the front surface of the front body 101.

In addition, the first touch screen 151 detects a touch for applying an input as well as outputting various visual content. Namely, when one point on the first touch screen 151 is touched, content corresponding to the touched point is input. The content input via the first touch screen 151 may be characters, numbers, menu items that can be indicated or designated in various nodes, and the like.

Further, the first touch screen 151 includes a first display for outputting visual information, and a first touch detection unit disposed on the first display. The first touch detection unit is formed to be transmissive to allow the internal first display to be seen, and may have a structure for enhancing visibility of the first display. The first display also includes a liquid crystal display (LCD) module for visually displaying information, an organic light emitting diode (OLED) module, an e-paper, and the like. In addition, the first touch screen 151 may be configured to perform independent input and output functions in the closed configuration in addition to execution of a function in relation to a second touch screen 155 shown in FIG. 2C.

Next, FIG. 2B illustrates a touch key pad being displayed on the first touch screen 151 and the user touching the keypad to input content and the content being displayed on the touch screen 151. In addition, an upper surface of the front body 101 may include a window covering its entire surface. External keys 131 are also disposed at one side of the first touch screen 151 so allow the user to easily and immediately select or switch a mode of the mobile terminal 100 in the closed configuration as shown in FIG. 2B.

Further, the audio output unit 152 may be implemented in the form of a receiver or a speaker for outputting a notification sound or a multimedia reproduction sound of the mobile terminal 100. The external keys 131 may be implemented to be exclusive for an input device and being discriminated from the first touch screen 151. Also, the external keys 131 may be formed as push type keys or buttons, or may be implemented in a touch sensing manner. The external keys 131 may also be set to immediately execute a particular function, turn on or off power, control the direction for selecting a cursor or an icon, execute or release of a lock mode, and the like.

In addition, the image input unit 121 may be implemented in the form of a camera module for capturing an image or video with respect to the user. The image input unit 121 may be installed on the front surface of the front body 101 with which the user can perform a video call with another user or take self pictures, be installed on the rear surface of the front body 101 or the rear body 102, or be configured to rotate or otherwise be moved to thus allow image capturing in various directions.

Further, the audio input unit 122 may be implemented in the form of a microphone to receive the user's voice and other sounds. The audio input unit 122 may be disposed on the side of the front body 101, or be installed at the same region as the external keys 131 to constitute a simple external appearance. Side keys 132 may also be mounted on the side of the front body 101 or the rear body 102. The side keys 132 may operate as a hot key for performing a special function such as adjusting a volume, brightness, menu search, etc., activation of the image input unit 121, and the like.

In addition, the interface unit 170 may be used as a communication link or passage through which the mobile terminal 100 can exchange data or the like with an external device. For example, the interface unit 170 may be implemented as a connection port for connecting an earphone to the mobile terminal 100 via a wireline or wireless mechanism, a port for short-range communications (e.g., an Infrared Data Association (IrDA) port, a Bluetooth™ port, a wireless LAN port, etc.), power supply ports for providing power to the mobile terminal, or the like. Also, the interface unit 170 may be a card socket for accommodating a SIM (Subscriber Identification Module) card or a UIM (User Identity Module) card, or an external card such as a memory card for storing information.

Thus, the mobile terminal 100 can execute various functions or perform input operations even in the closed configuration, and output visual/audible information using the first touch screen 151, the audio output unit 152, and the like. Further, the mobile terminal 100 according to an embodiment of the present invention is configured to implement the opened configuration as the rear body 102 moves in a widthwise direction (horizontal direction) as shown in FIG. 2C from the closed configuration as shown in FIG. 2A. In this instance, when viewed based on the rear body 102, the front body 101 moves.

Figure 4:
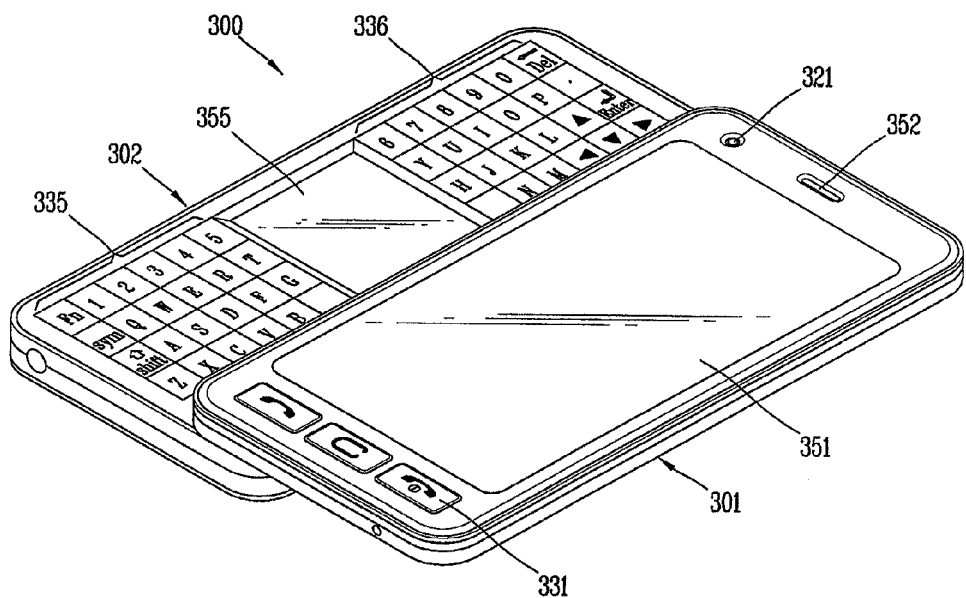
FIG. 4 is a front perspective view of a mobile terminal according to another embodiment of the present invention.

Also, when the rear body 102 is slid down in the state as shown in FIG. 2A, the mobile terminal is opened as shown in FIG. 2C. The mobile terminal 100 may be also opened in a slide-up manner as shown in FIG. 4. As shown in FIG. 2C, a first key pad 135 and a second key pad 136 are combined to constitute a set keypad or keyboard. For example, the first and second keypads 135 and 136 may form the QWERTY key board. The first and second keypads 135 and 136 can also be variably modified in their arrangement. For example, the mobile terminal 100 as shown in FIG. 2C has number keys directly disposed on the first and second keypads 135 and 136, while the mobile terminal shown in FIG. 9 has number keys displayed in a touch inputtable form on the second touch screen 155, rather than being disposed on first and second keypads 135' and 136'.

In addition, FIG. 2 shows the first and second keypads 135 and 136 formed in four rows, but the structural characteristics of the present embodiment can be also applicable to a mobile terminal having first and second keypads in five or more rows. Further, content input through the first and second keypads 135 and 136 can be output via the first touch screen 151. Thus, such disposition of the first and second keypads 135 and 136 reduces the possibility of malfunction resulting from the small size of the key board and helps the user easily input information in the closed configuration of the mobile terminal 100. The first and second keypads 135 and 136 are also highly effective when the mobile terminal 100 is in an editing mode such as text message or memo writing.

In addition, as discussed above and as shown in FIG. 2C, the second touch screen 155 is disposed between the first and second keypads 135 and 136. Further, the second touch screen 155 visually outputs or displays various content that can be input through touch operations. The first and second keypads 135 and 136 can also include left-hand dedicated keys and right-hand dedicated keys, respectively, such that the user's hands do not cover the second touch screen 155 while using the first and second keypads 135 and 136.

Also, the second touch screen 155 can extend the function of the first and second keypads 135 and 136, and provide various contents discriminated from the first touch screen 151 in various modes. In addition, the first and second keypads 135 and 136 and the second touch screen 155 may be changed to an active state as the rear body 102 is opened. Conversely, they can be automatically changed to the inactive state (referred to as a 'power cut-off' or 'locked state') as the rear body 102 is closed.

In addition to implementation of a particular key board (e.g., the QWERTY key board), the first and second keypads 135 and 136 can be set to have additional functions. Namely, a separate key (e.g., hot key) can be disposed to directly execute a particular function, or be set to be pressed together with an auxiliary key to execute various functions. For example, with reference to FIG. 8, the power of the first screen 151 may be turned on or off by pressing a first touch screen power key 157b in a state that an additional auxiliary key 157a is pressed, and the second touch screen 155 may be turned on or off by pressing a second touch screen 157c in the state that the additional auxiliary key 157a is pressed.

Further, the second touch screen 155 may be configured to display a list of letters, characters or numbers that can not be directly input using the first and second keypads 135 and 136. Also, when a letter or number list is displayed on the second touch screen 155, and the user touches a particular number or symbol, the selected content can be output to the first touch screen 151. The mobile terminal 100 may also be configured to output an audible or tactile including vibration reaction with respect to each touch when a touch is applied to the second touch screen 155.

In addition, various types of push buttons may be applicable to the first and second keypads 135 and 136. For example, keys of the first and second keypads 135 and 136 can have a square or rectangular shape, or have a circular, oval, or any other shapes. The keys can also be formed to be inclined to allow the user to conveniently press them with their thumb while holding the rear body 102 with both hands. Further, the mobile terminal 100 shown in FIG. 2C illustrates the first and second keypads 135 and 136 being operable in a push manner, but the keypads can be operated in a tactile manner.

Figure 3:
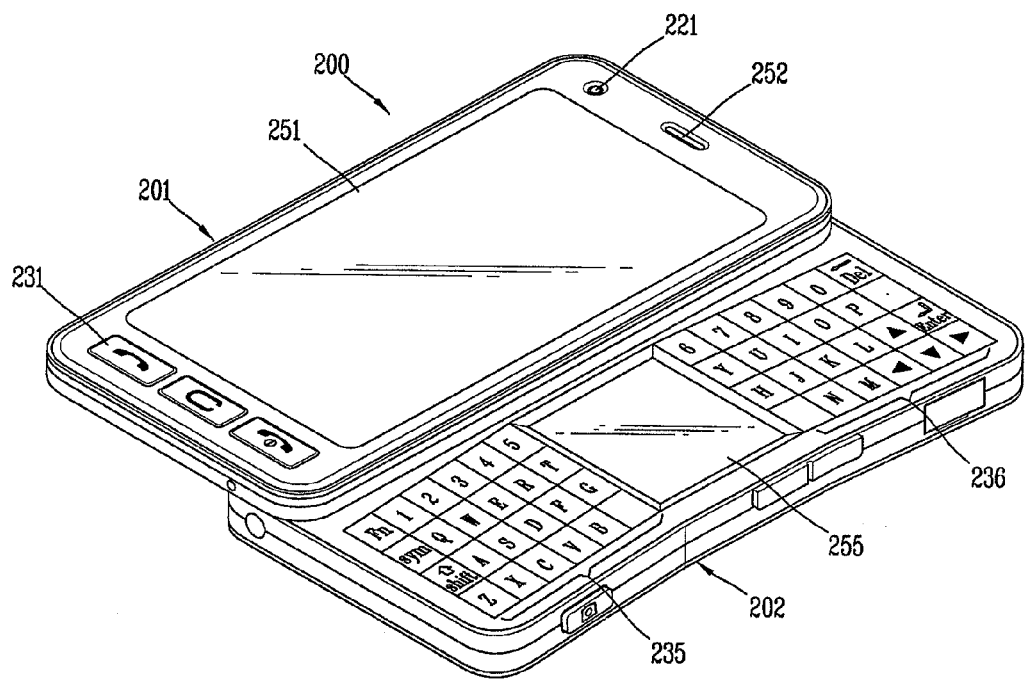
FIG. 3 is a front perspective view of a mobile terminal according to yet another embodiment of the present invention.

Next, FIG. 3 is a front perspective view of a mobile terminal 200 according to another embodiment of the present invention. The mobile terminal 200 has a similar configuration as the mobile terminal 100. Namely, the mobile terminal 200 includes a rear body 202 opened in a slid-down manner with respect to a front body 201 including a first touch screen 251, an image input unit 221, an audio output unit 252, external keys 231, and the like. First and second keypads 235 and 236 are also formed and spaced apart on a front surface of the rear body 202, and a second touch screen 255 is provided between the first and second keypads 235 and 236.

With reference to FIG. 3, the first and second keypads 235 and 236 are formed to be inclined backward to the surface of the second touch screen 255 to allow the user to easily perform input operations through the first and second keypads 235 and 236. The front body 201 is also formed to have a flat plate form as shown in FIG. 3 or may be formed to be inclined like the rear body 202.

Next, FIG. 4 is a front perspective view of a mobile terminal 300 according to another embodiment of the present invention. As shown, the mobile terminal 300 is configured such that a rear body 302 having a second touch screen 355 and first and second keypads 335 and 336 is opened in a slide-up manner with respect to a front body 301 including a first touch screen 351, an image input unit 321, keys 331, an audio output unit 352, and the like. In this instance, the first and second keypads 335 and 336 do not cover the first and second touch screens 351 and 355, thus improving the user convenience.

Figure 5:
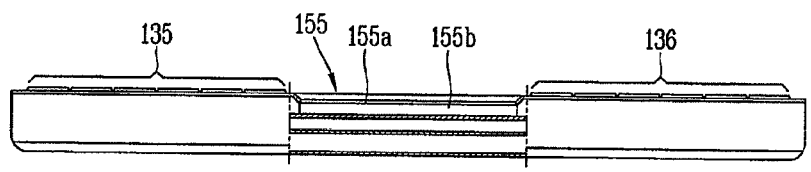
FIG. 5 is a side view illustrating a partial section of a rear body of the mobile terminal according to an embodiment of the present invention.

Next, FIG. 5 is a side view illustrating a partial section of a rear body of the mobile terminal 100 according to an embodiment of the present invention. As shown, the second touch screen 155 is disposed between the first and second keypads 135 and 136 on the rear body 102 and includes a display 155b and a touch detection unit 155a disposed on the display 155b. The display 155b and the touch detection unit 155a can also be separately controlled by a controller.

Figure 6:
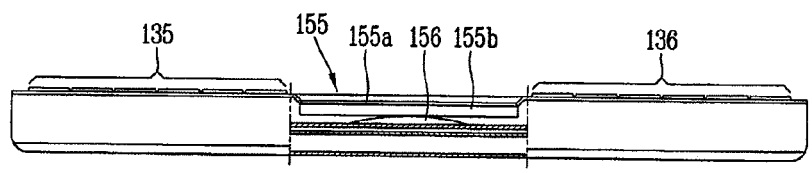
FIG. 6 is a side view illustrating a partial section of a rear body of the mobile terminal according to another embodiment of the present invention.

FIG. 6 is a side view illustrating a partial section of a rear body of the mobile terminal 100 according to another embodiment of the present invention. As shown, the second touch screen 155 additionally includes a switch 156 mounted therein to allow inputting operations to be performed in a push manner. Accordingly, when the user moves a pointer or the like by the touch detection unit 155a and presses the touch detection unit 155a, the switch 156 may operate to immediately select or execute a corresponding function. A plurality of switches 156 can also be formed at a lower portion of the second touch screen 155. A dome switch having a good tactile sensation can also be used as the as the switch 156.

Figure 7A:
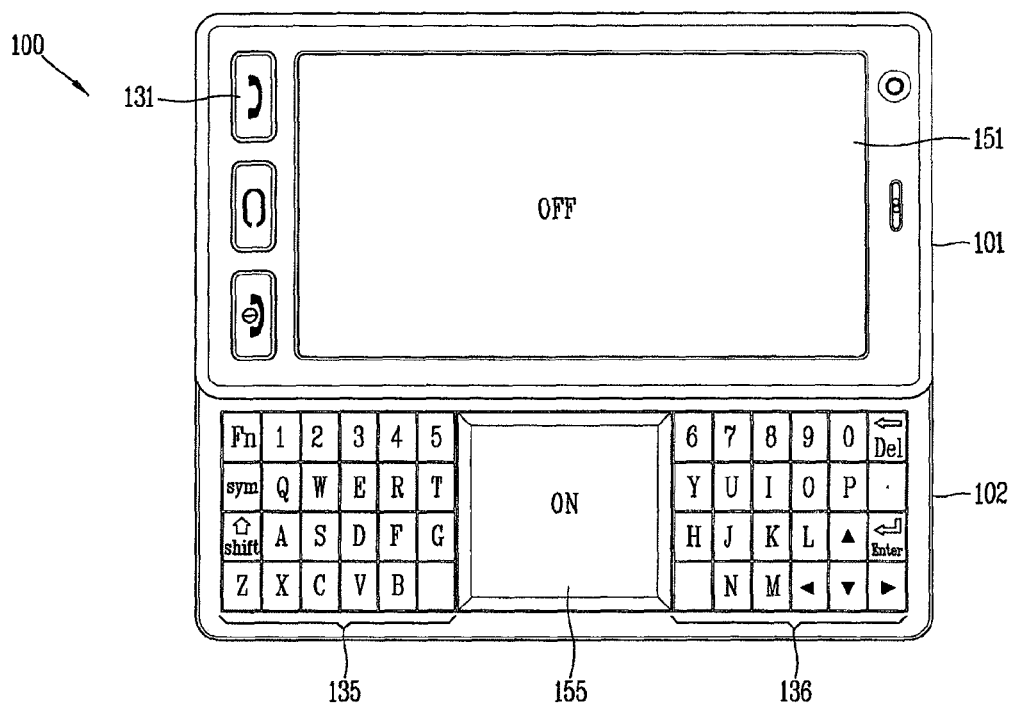
FIGS. 7A and 7B are overviews illustrating operational states for controlling power of the first or second touch screen of the mobile terminal according to an embodiment of the present invention.
Figure 7B:
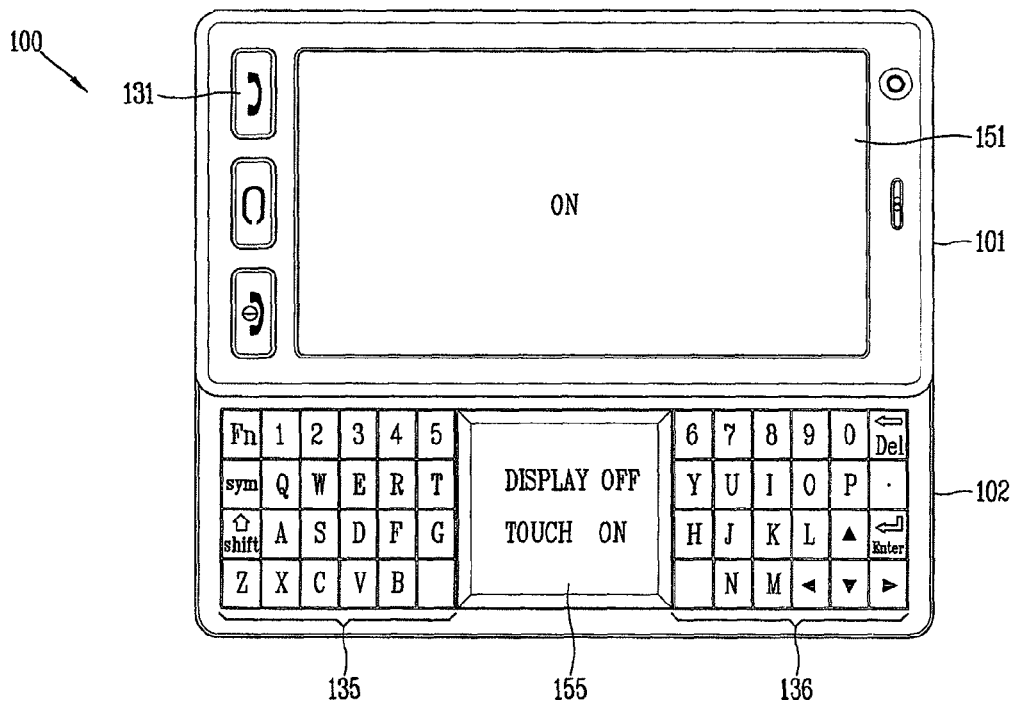

Next, FIGS. 7A and 7B are overviews illustrating operational states for controlling power of the first or second touch screens of the mobile terminal according to an embodiment of the present invention. When the mobile terminal 100 uses the limited power stored in a battery thereof, the power applied to the first touch screen 151 or the second touch screen 155 can be separately controlled to save power. Namely, as shown in FIG. 7A, when the first touch screen 151 (which consumes a relatively large amount of power) is not in use, the power of the first touch screen 151 can be turned off according to a user selection or when a pre-set condition is met.

In this instance, the power of the display and the touch detection unit constituting the first touch screen 151 can be separately controlled such that the display is turned off while the touch detection unit is turned on. The touch detection unit can be also used as an input device for moving the point or the like seen on the second touch screen 155. Conversely, FIG. 7B illustrates the first touch screen 151 being turned on whereas the display of the second touch screen 155 is turned off and only the touch detection unit is turned on. In this instance, the touch detection unit of the second touch screen 155 can be used as an input device for moving the pointer displayed on the first touch screen 151, and in addition, the power of the touch detection unit included in the second touch screen 155 can be turned off to save power.

Figure 8:
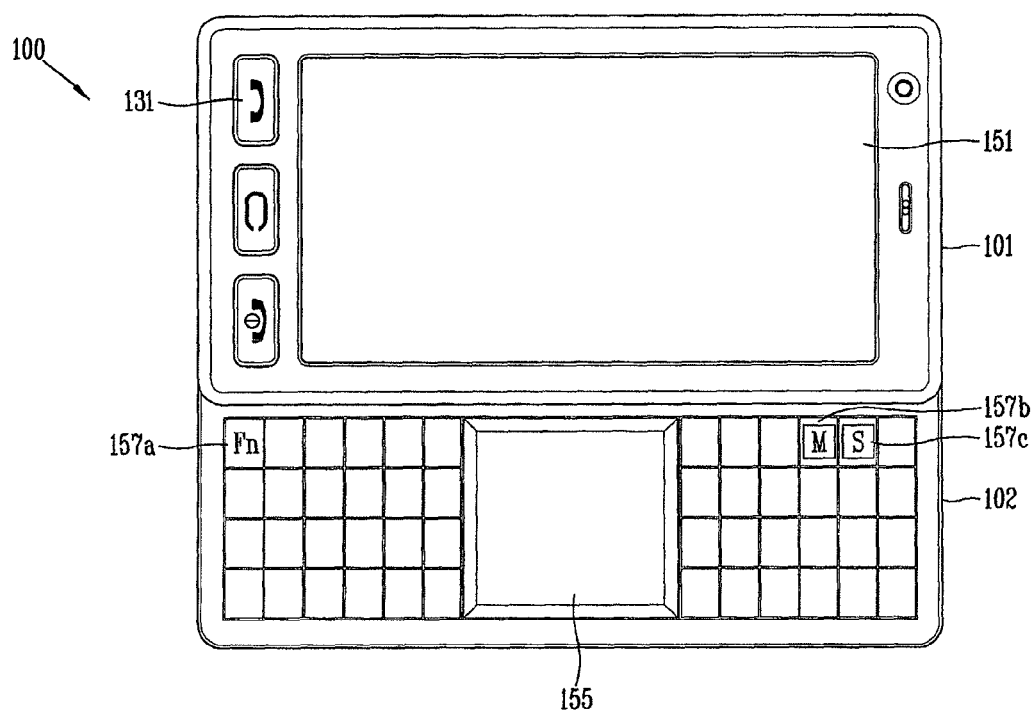
FIG. 8 is a front view of the mobile terminal with keys disposed to turn on or off the first or second touch screen so as to control power of the mobile terminal according to an embodiment of the present invention.

Turning next to FIG. 8, which is a front view of the mobile terminal 100 with keys disposed to turn on or off the first or second touch screens 151 and 155 so as to control power of the mobile terminal 100 according to an embodiment of the present invention. As shown, the first touch screen 151 or the second touch screen 155 can be turned on or off by manipulating the keys constituting the first key pad 135 or the second key pad 136. Namely, the power of the first touch screen 151 can be turned on or off when the first touch screen power key 157b is pressed in the state that the auxiliary key 157a is pressed, and the power of the second touch screen can be turned on or off when the second touch screen power key 157c is pressed in the state that the auxiliary key 157a is pressed. The first touch screen power key 157b and the second touch screen power key 157c can also be 'hot keys' in the aspect that they immediately execute corresponding functions.

Figure 9:
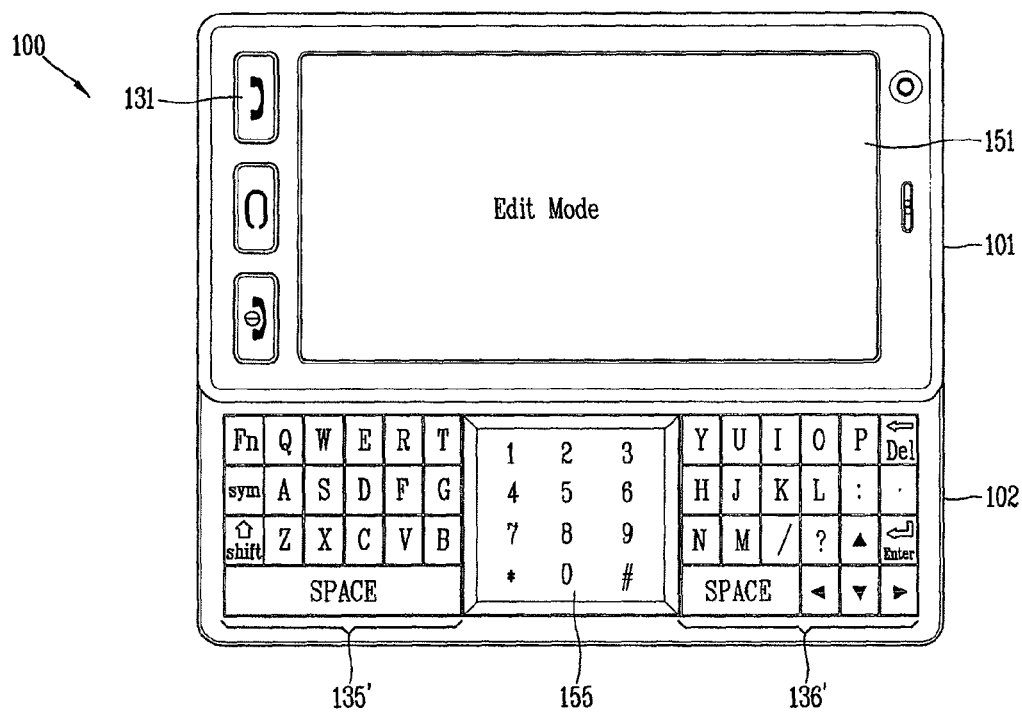
FIGS. 9 to 37 are overviews illustrating display states of the first and second touch screens in various modes of the mobile terminal according to embodiments of the present invention.

Next. FIGS. 9 to 37 are overviews illustrating operational states showing display states of the first and second touch screens 151 and 155 in various modes of the mobile terminal 100 according to different embodiments of the present invention. In more detail, FIG. 9 illustrates the terminal 100 being in an edit mode. In this instance, the first touch screen 151 is used for displaying input content, and the first and second keypads 135 and 136 and the second touch screen 155 are used to input content displayed on the first touch screen 151.

In particular, as shown in FIG. 9, if the keys disposed in the first and second keypads 135 and 136 do not include number keys, the second touch screen 155 can display numbers to allow the user to input numbers by touching the second touch screen 155 without having to change the key board at several stages. Thus, the second touch screen 155 serves as an extended input unit for extending the amount of content that can be input using just the first and second keypads 135 and 136.

Figure 10:
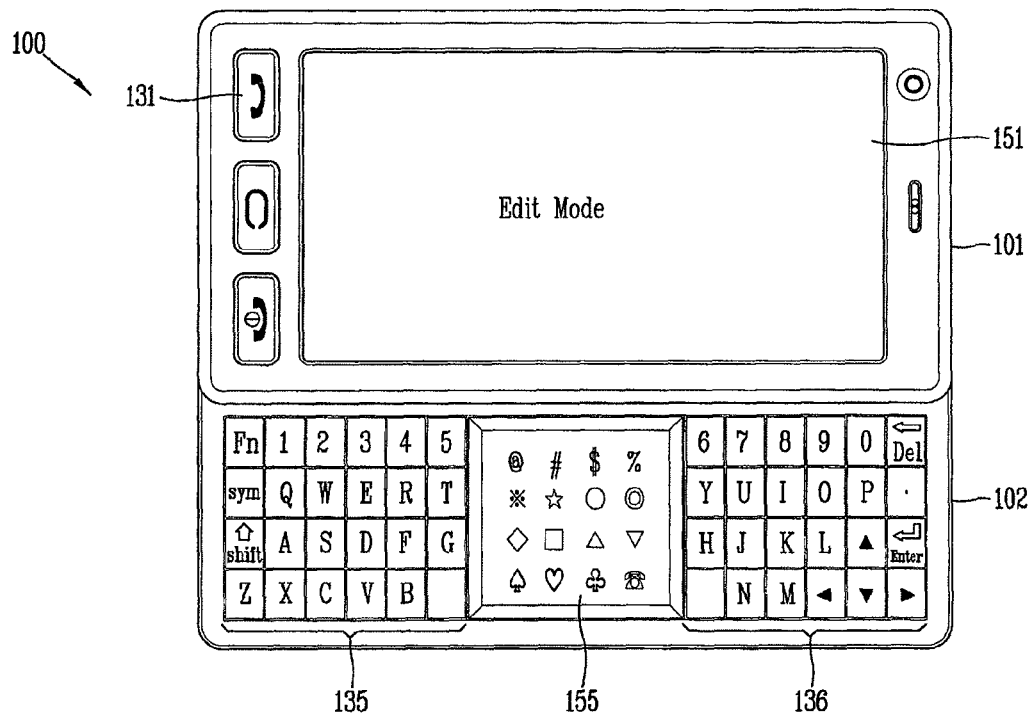
Figure 11:
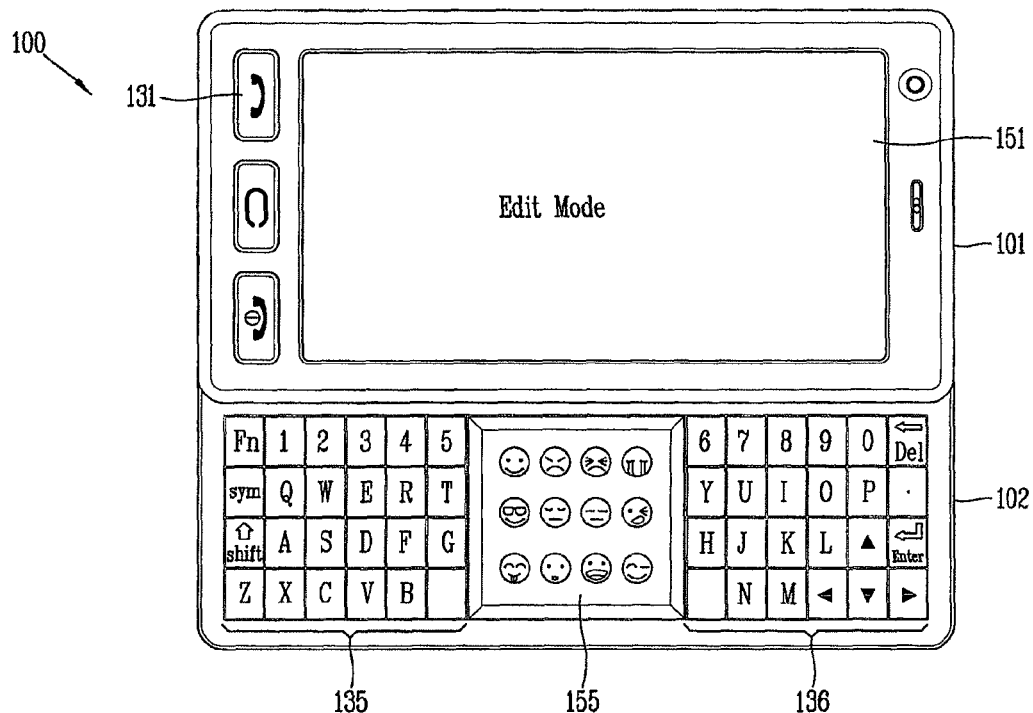

In addition, FIG. 10 illustrates the second touch screen 155 displaying special symbols or special characters that the user can input by touching, and FIG. 11 illustrates the second touch screen 155 displaying emoticons, thumbnail images. Further, the information displayed for achieving the extended input unit of the second touch screen 155 can be set or created by the user. In particular, the user can previously store frequently used text, numbers or their combinations and have them displayed through the second touch screen 155, thereby increasing the user convenience (e.g., the time required for editing or creating content is reduced). Also, the second touch screen 155 may be configured to input a picture entity arbitrarily drawn by a touch in a particular mode and have the input picture displayed on the first touch screen 151.

Figure 12:
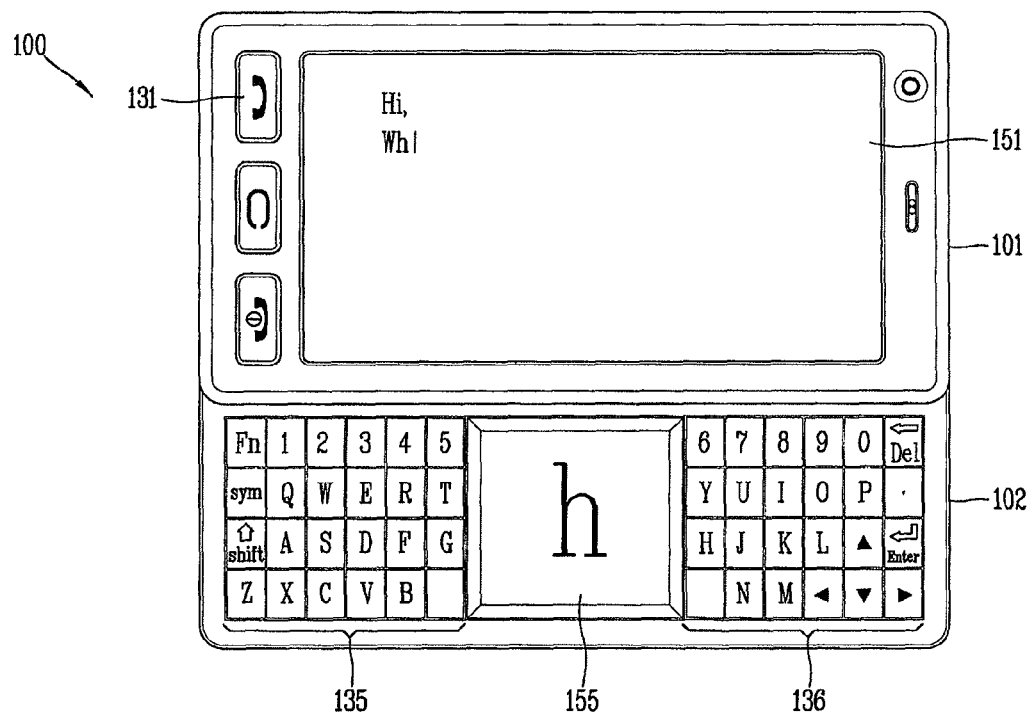

FIG. 12 illustrates the second touch screen 155 displaying content that has recently been input through the first keypad 135 or the second keypad 136 in a magnified manner compared with that displayed or to be displayed on the first screen 151. The magnified content displayed on the second touch screen 155 may be a single letter or word as shown in FIG. 12, or some recently input portion of sentence. Accordingly, the content to be input to the first touch screen 151 can be easily checked and erroneous input operations can be reduced when using the first and second keypads 135 and 136.

Figure 13:
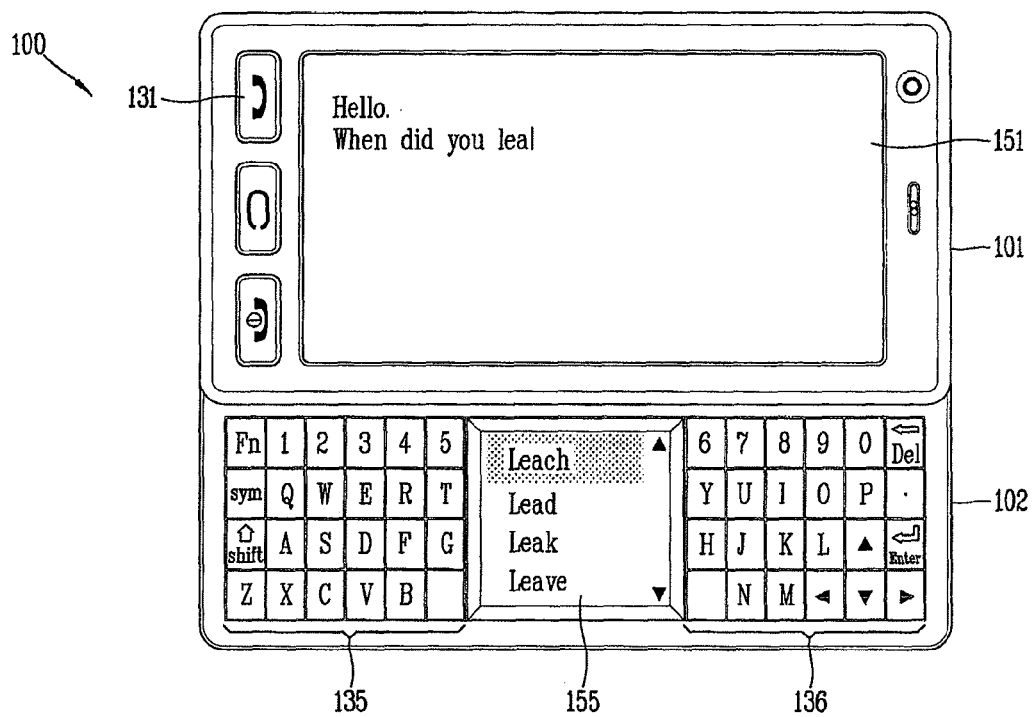

FIG. 13 illustrates the second touch screen 155 displaying a word list including possible words being displayed based on a few characters already input. For example, as shown in FIG. 13, when the user has input the characters 'lea', the second touch screen 155 outputs a word list including the characters 'lea'. Then, the user can touch select a desired word from the list to more easily input information to the touch screen 151. In addition, the amount of characters first input before the word list is display can be one, two or more characters and can be set by the user. In addition, the word list may include a 'frequently used expression' which has been set by the user or previously stored.

Figure 14A:
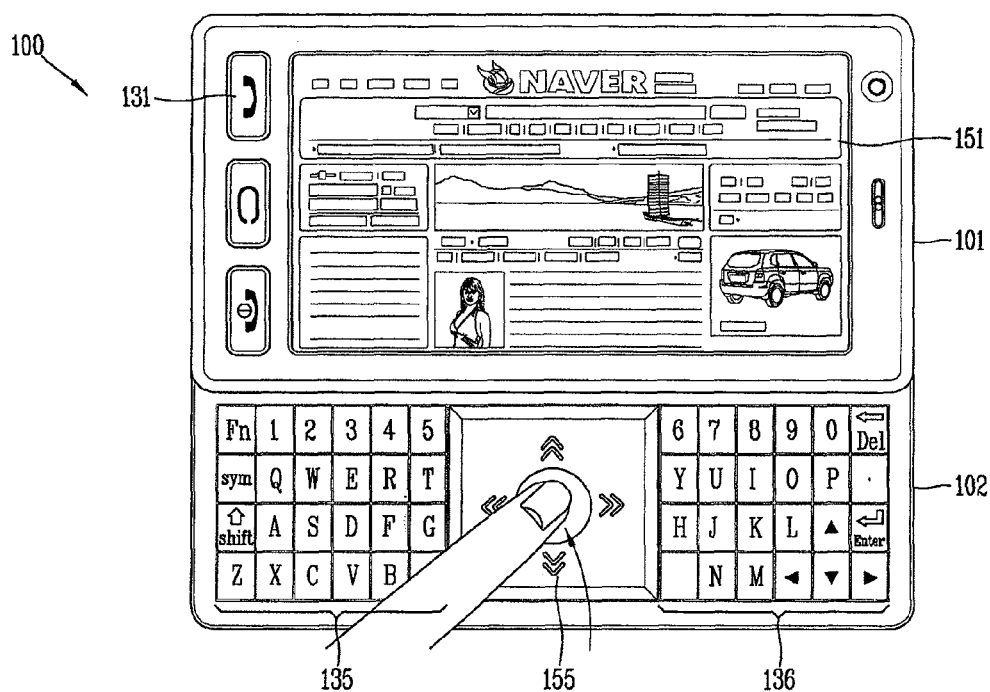
Figure 14B:
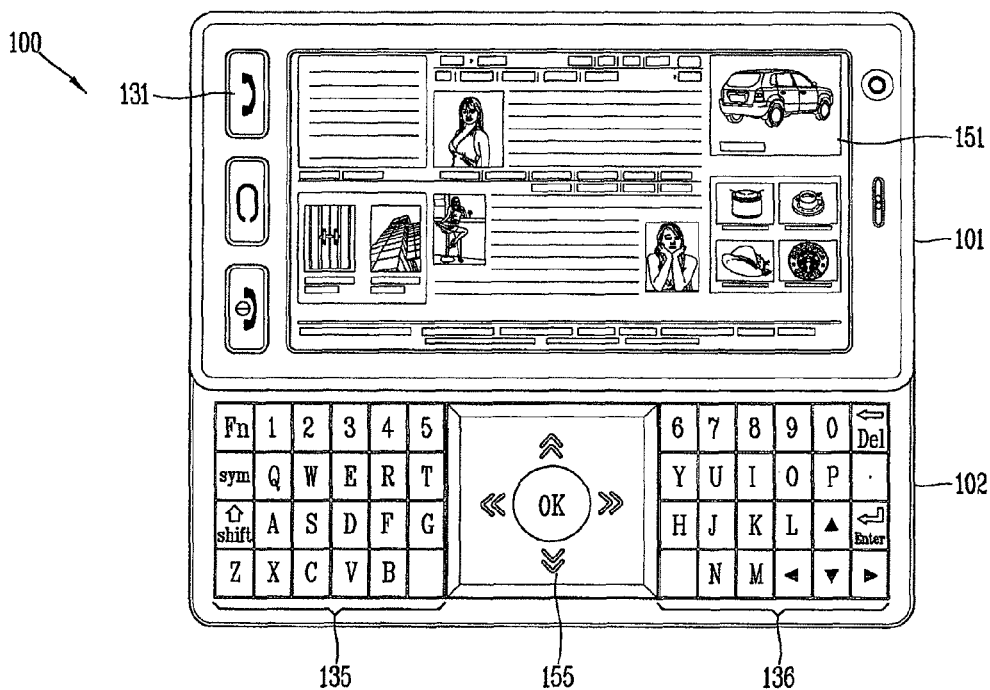

FIGS. 14A and 14B illustrate the second touch screen 155 displaying the directional keys and an OK key that the user can touch to scroll through or select options when web browsing on the first touch screen 151. For example, to scroll web pages, the user can use the directional keys to move a cursor over a scroll bar displayed on the web page and then manipulate the OK key and the directional keys to scroll through the displayed web page, etc. Further, in this mode, the power of the display of the second touch screen 155 may be turned off and only the touch detection unit may be turned on. Thus, because the user can scroll the web page displayed on the first touch screen 151 using only the second touch screen 155, the user does not cover portions of the first touch screen 151 when he or she wants to scroll the information displayed on the first touch screen 151.

Further, in an alternative embodiment, the contents displayed in the display 155 can include a currently viewed web page, and the information displayed in the touch screen 155 can include a web address of the currently viewed web page such that if the currently viewed web page displayed in the display 151 freezes, the web address of the currently viewed web page can be selected in the touch screen 155 to re-access the web page.

Figure 15:
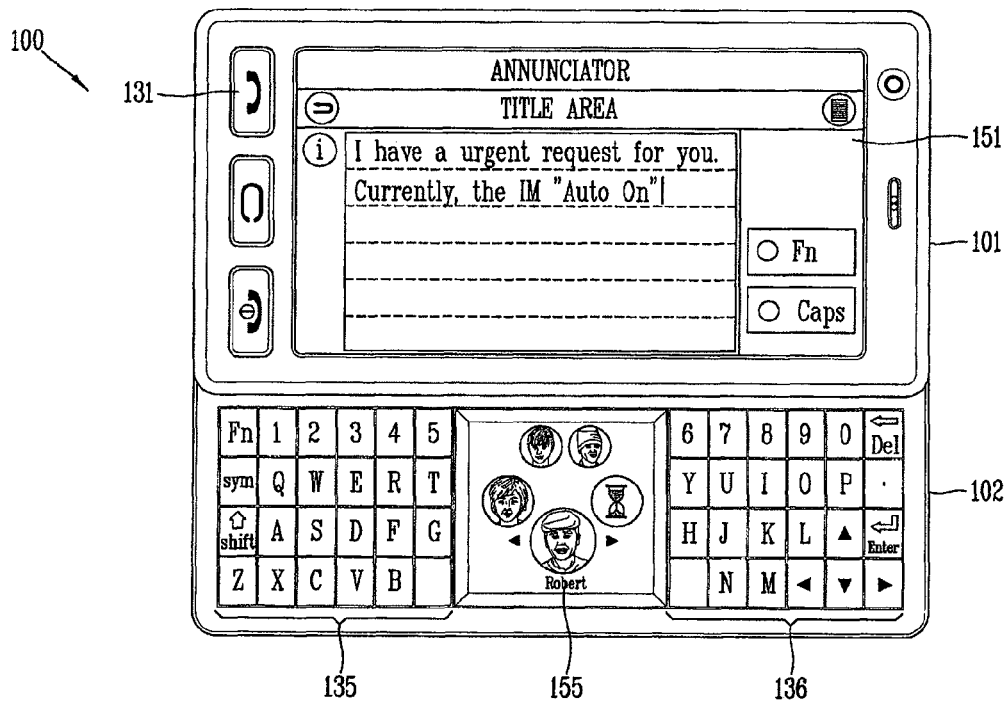

Next, FIG. 15 illustrate the second touch screen 155 displaying favorite functions or friends of the user. Thus, the user can execute a favorite function by touching the icon corresponding to that particular function. Also, when the user touches a particular icon, the icon is enlarged to inform the user the icon is being selected. If the displayed icons correspond to favorite contacts in a phone book of the user, the user can automatically call a user by selecting the corresponding icon.

Further, when the mobile terminal 100 is opened, editing can be performed using the first keypad 135 and the second keypad 136, and the second touch screen 155 can output separate content in an mode independent from the first touch screen 151.

Figure 16:
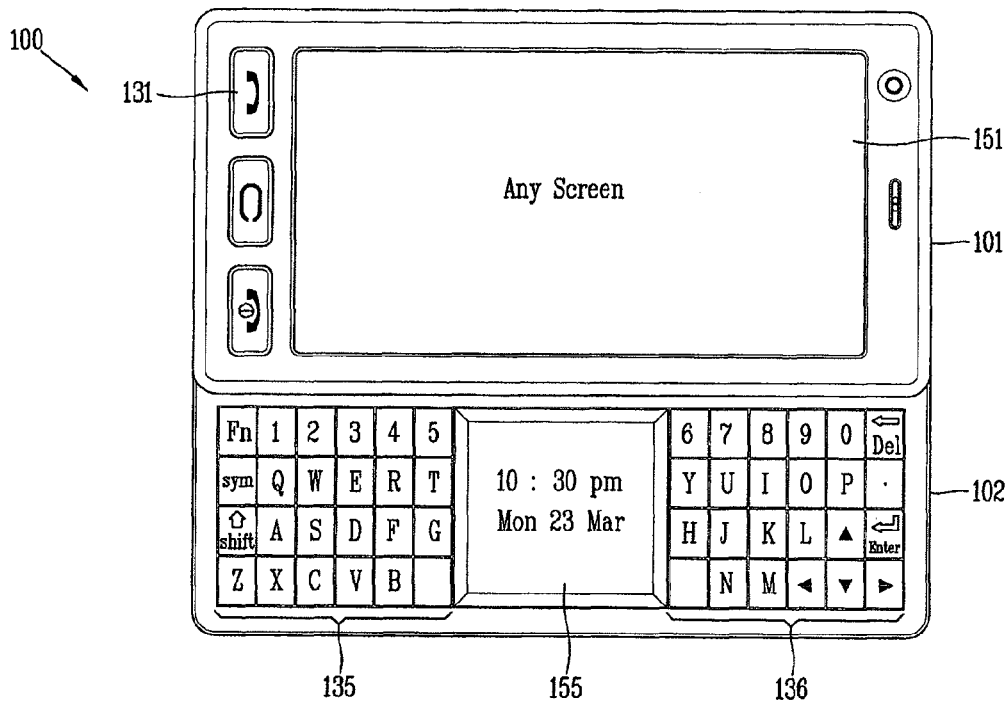
Figure 17A:
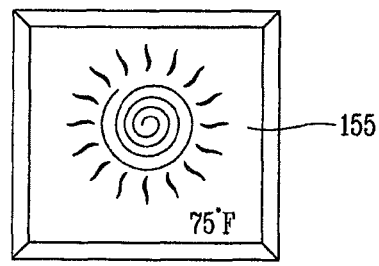
Figure 17B:
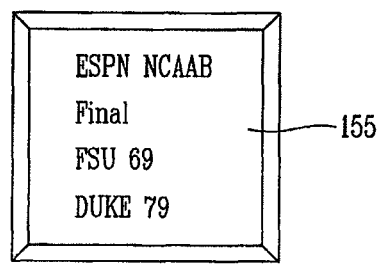
Figure 17C:
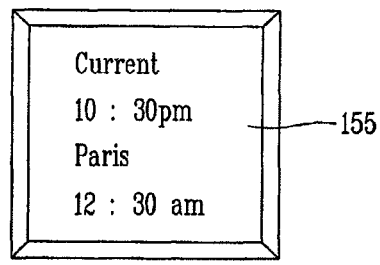

FIG. 16 illustrate the second touch screen 155 displaying time and date information, etc. when the first touch screen 151 is in a certain mode. In this instance, the second touch screen 155 may be configured such that power of the touch detection unit is OFF. Further, various content may be output to provide desired information or be output according to a user selection as shown in FIG. 17. In particular, FIG. 17(*a*) illustrate the second touch screen 155 displaying a current temperature together with a graphic image, color, etc. FIG. 17(*b*) illustrates the second touch screen 155 displaying sport scores, and FIG. 17(*c*) illustrates the second touch screen 155 displaying a time in a current area and a time in another area (Paris in this example).

Figure 18:
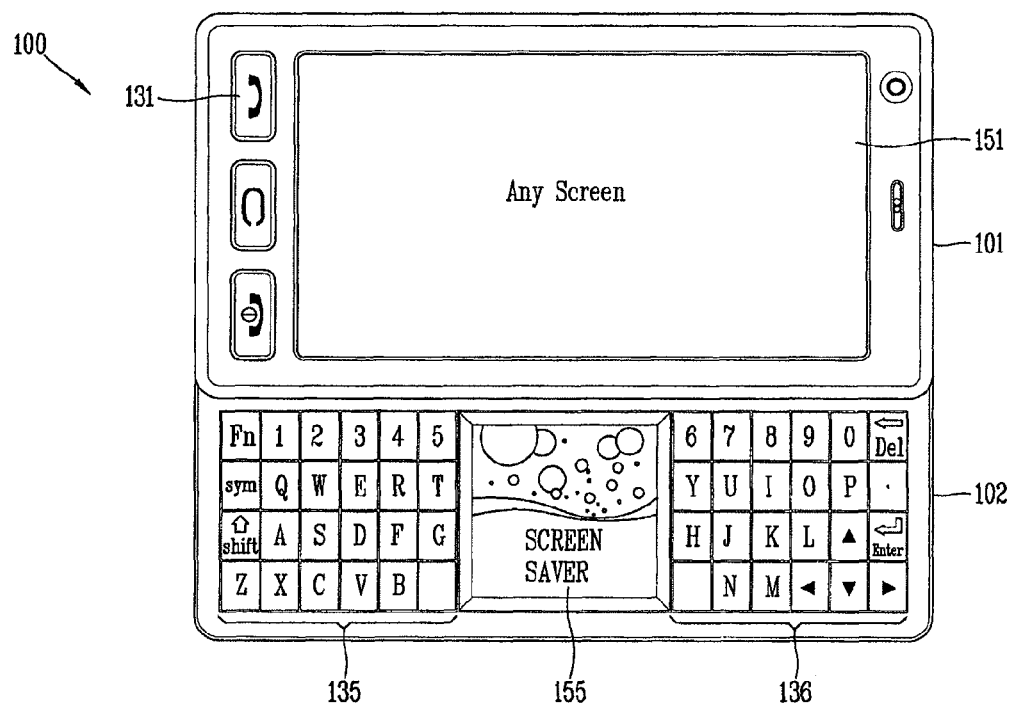
Figure 19:
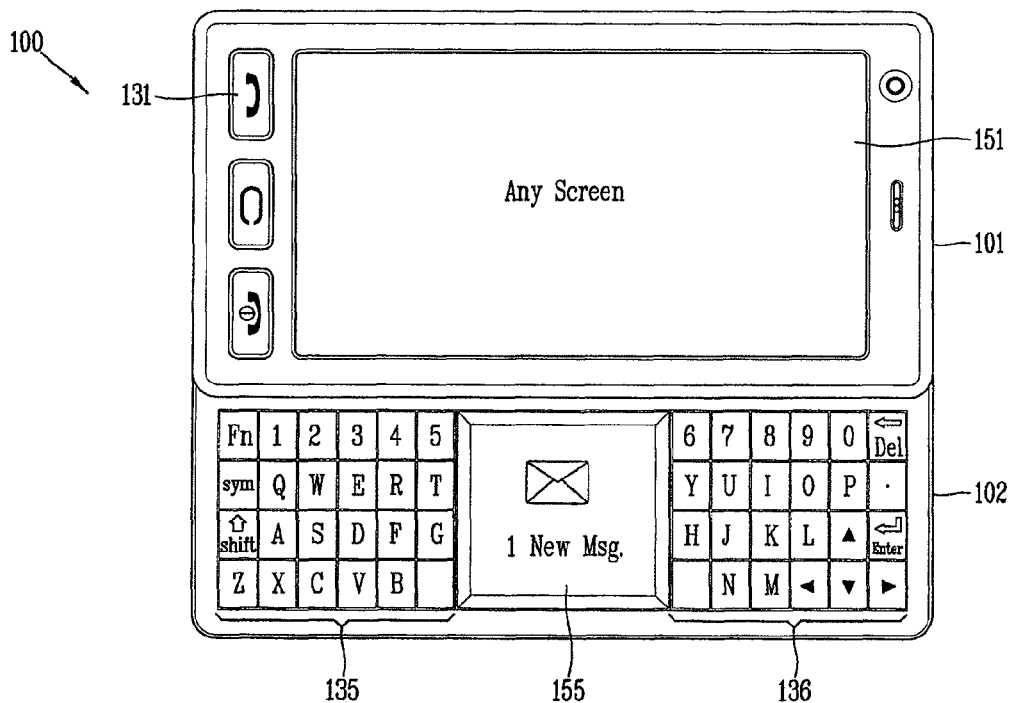

FIG. 18 illustrate the second touch screen 155 displaying a screen saver image when the first touch screen 151 is in a certain mode (messaging, note pad, contact number editing, etc.) and the second touch screen 155 is not in use. FIG. 19 illustrates that when the first touch screen 151 is in a certain mode and a message is received from someone, the second touch screen 155 displays the corresponding information regarding the received message. In this instance, when the user touches the second touch screen 155, the detailed content of the message can be displayed on the first touch screen 151. In addition, the second touch screen 155 can be configured to immediately display the message.

Figure 20A:
Figure 20B:
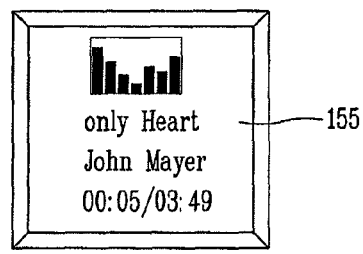
Figure 21:
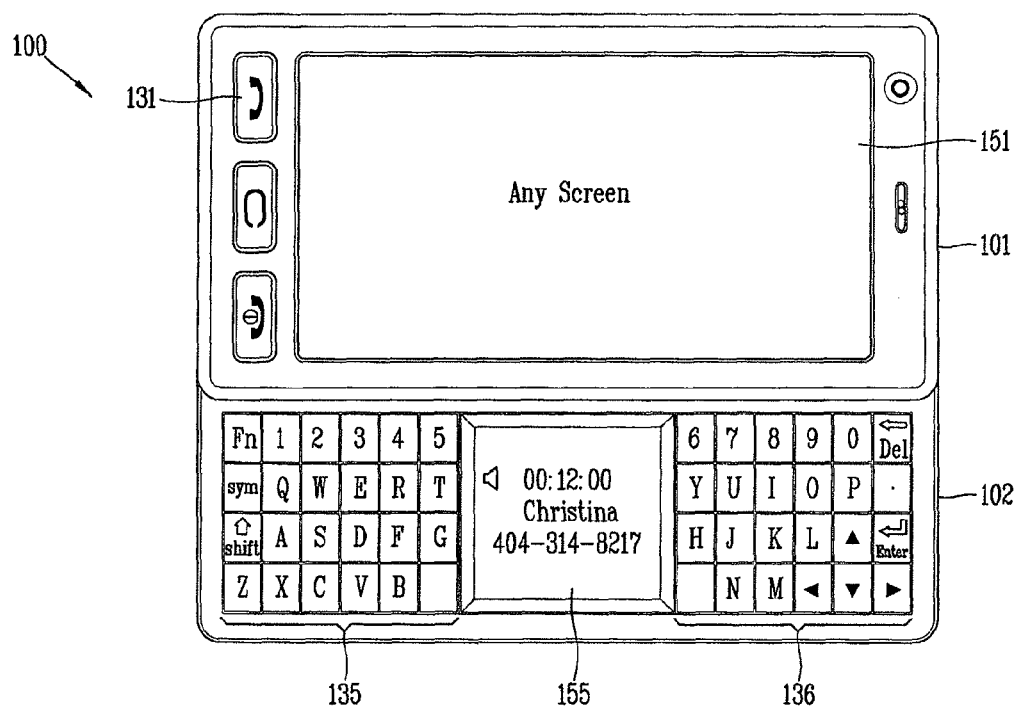

In addition, as shown in FIGS. 20 and 21, when the first touch screen 151 is in a certain mode and a call is received from someone, the call information can be displayed on the second touch screen 155 (FIGS. 20(*a*) and 21), or information related to music being executed may be displayed (FIG. 20(*b*)).

Figure 22:
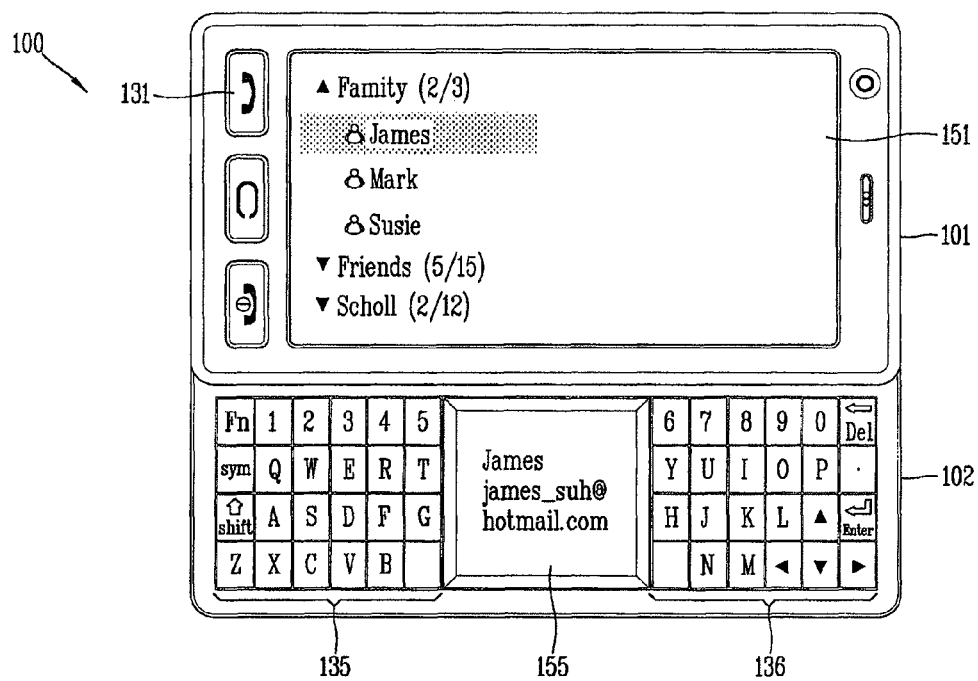

Further, FIG. 22 illustrates that when a higher list is output on the first touch screen 151, the second touch screen 155 displays a lower list with respect to items on which the pointer is positioned or items are selected. Namely, in this instance, the user can touch an item on the first touch screen 151, and the second touch screen 155 displays sub items that the user can touch to select.

Figure 23:
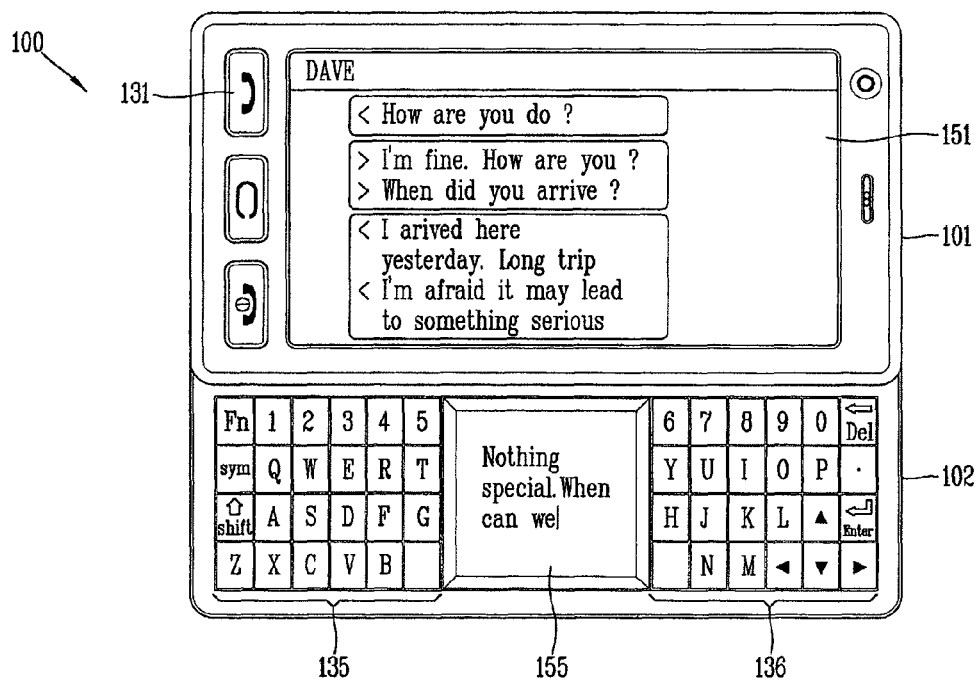

FIG. 23 illustrates the second touch screen 155 being used to input contents during a chatting session. In particular, the first touch screen 151 displays conversion content already input by the parties, and the second touch screen 155 displays content currently being input by the user of the mobile terminal 100. Thus, the configuration includes the first and second keypads 135 and 136 and the second touch screen 155 are all disposed on the rear body 102, and has an advantage that content can be easily input by using the mobile terminal with a limited small size and the user can easily check the input content.

Figure 24:
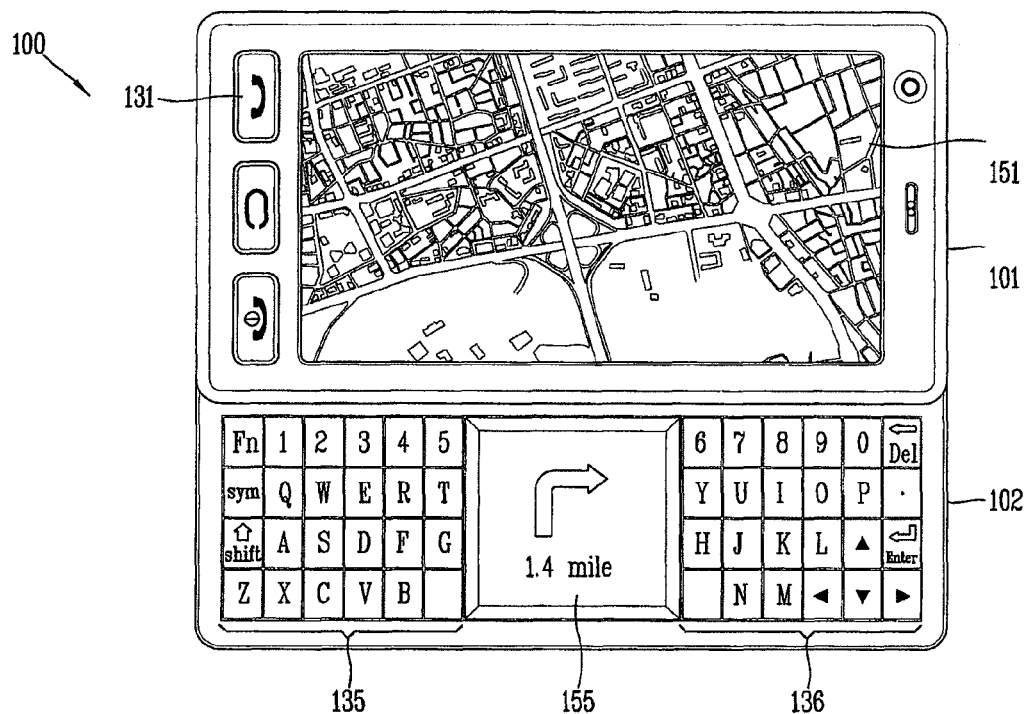
Figure 25:
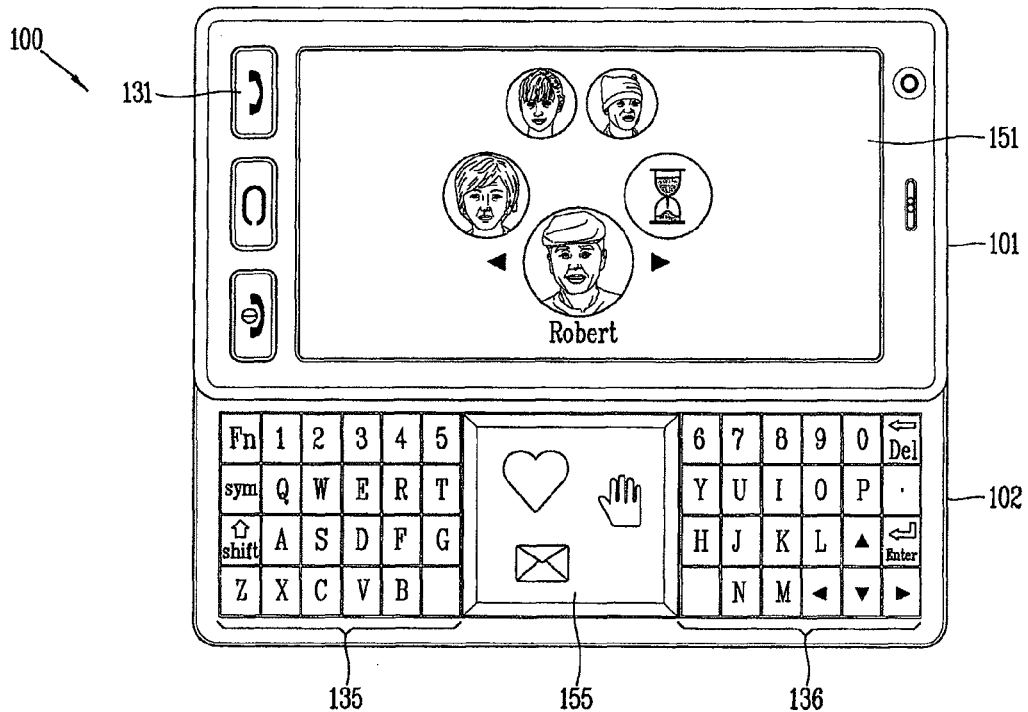
Figure 26:
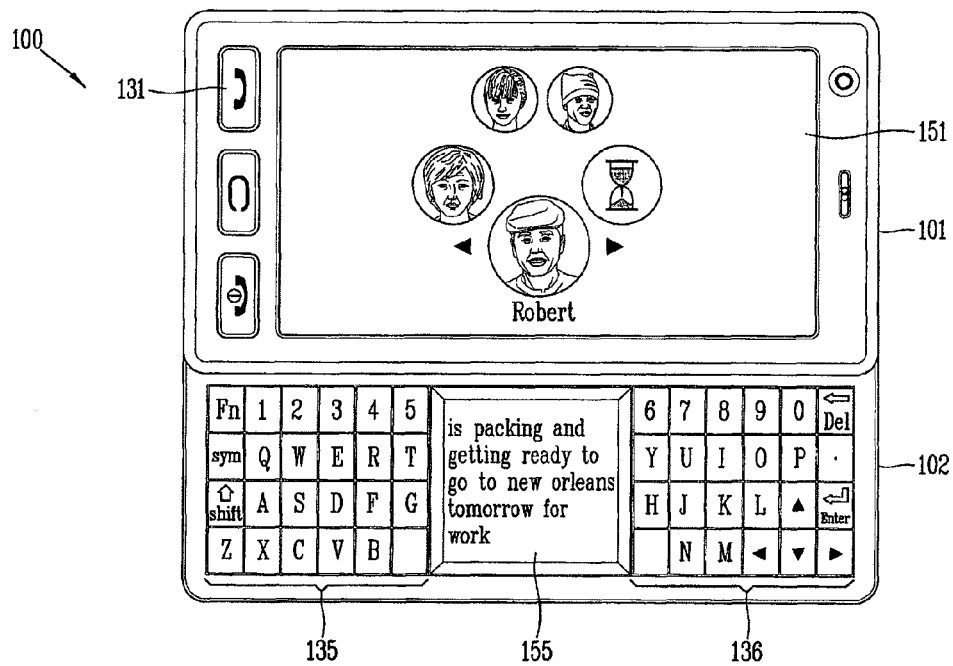

Further, FIG. 24 illustrates that when navigation is used on the mobile terminal, the first touch screen 151 outputs a map around the location where the user is located and the second touch screen 155 displays the direction and distance the user may take. FIG. 25 illustrates the first touch screen 151 displaying favorite counterparts in the form of a selectable list or icons that the user can touch to select, and the second touch screen 155 displaying operation/information that can be performed with respect to each counterpart in the form of a selectable icon. In this instance, the second touch screen 155 may be configured to receive information provided in a particular Internet site or blog and output the same, as shown in FIG. 26.

Figure 27:
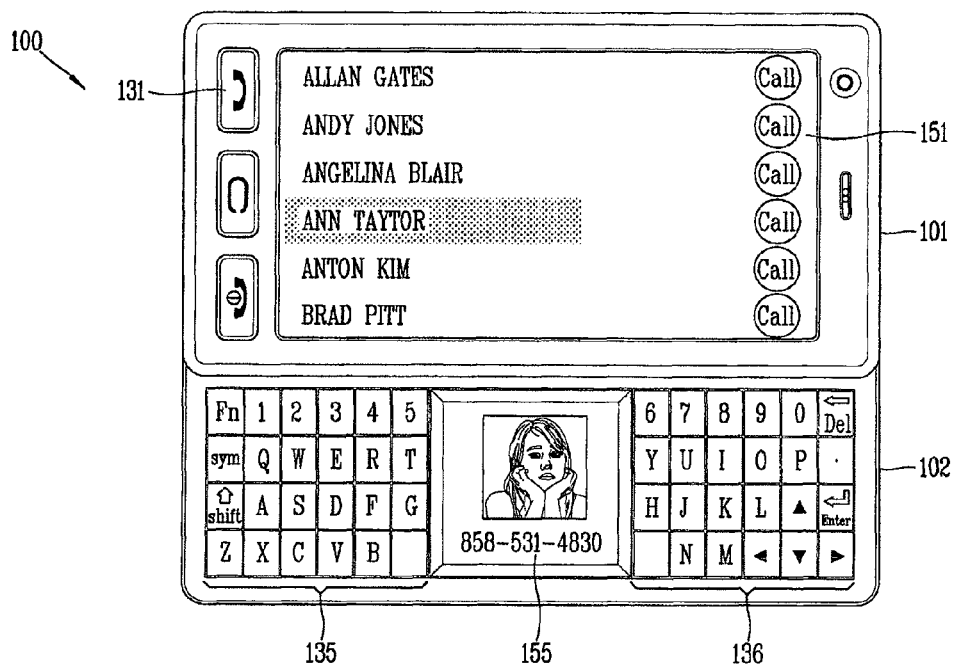
Figure 28:
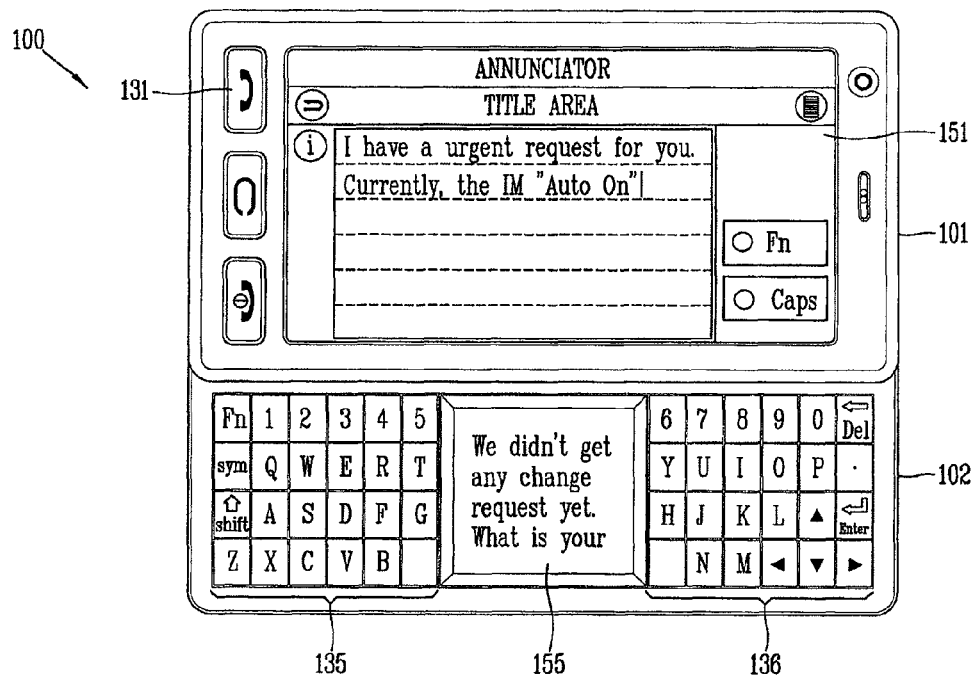

Next, FIG. 27 illustrates the first touch screen 151 displaying a buddy list that the user can touch select, and the second touch screen 155 displaying a phone number, a photo image, and the like, of a currently selected counterpart. FIG. 28 illustrates the second touch screen 155 displaying a message being created and the first touch screen 151 displaying a message which has been already received. Thus, the user can conveniently reply to a message by using the first key pad 135, the second keypad 136, and the first touch screen 151 with reference to the second touch screen 155.

Figure 29:
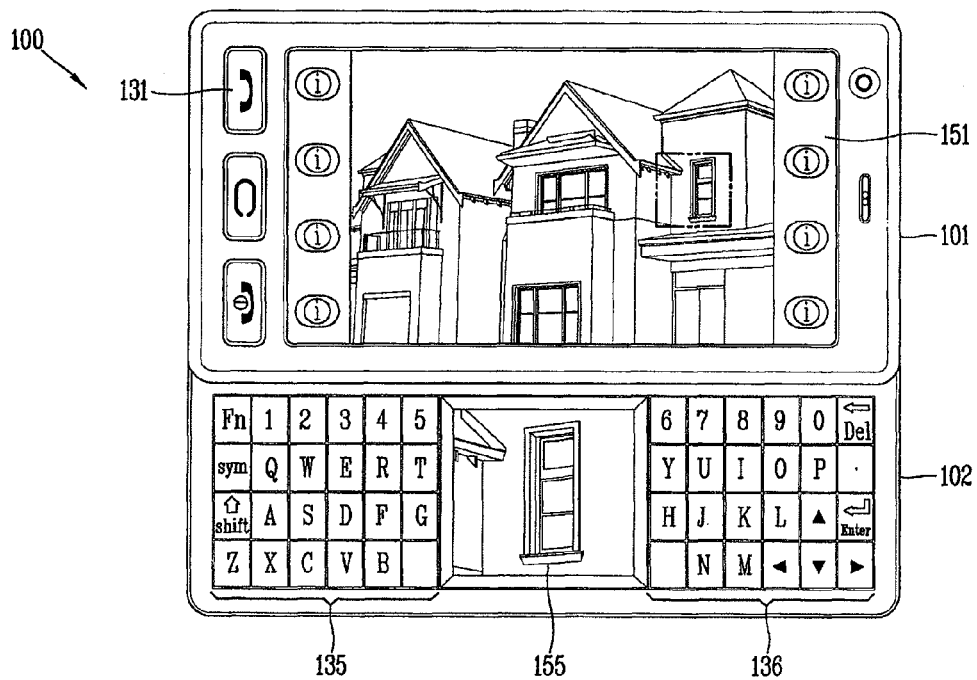

Next, FIG. 29 illustrates that the first and second touch screens 151 and 155 display different images when image capturing is performed on the mobile terminal 100. For example, as shown in FIG. 29, content selected from the image displayed on the first touch screen 151 can be separately magnified and displayed on the second touch screen 155. In addition, the first touch screen 151 can output an image to be currently captured while the second touch screen 155 can output a finally captured image.

Figure 30:
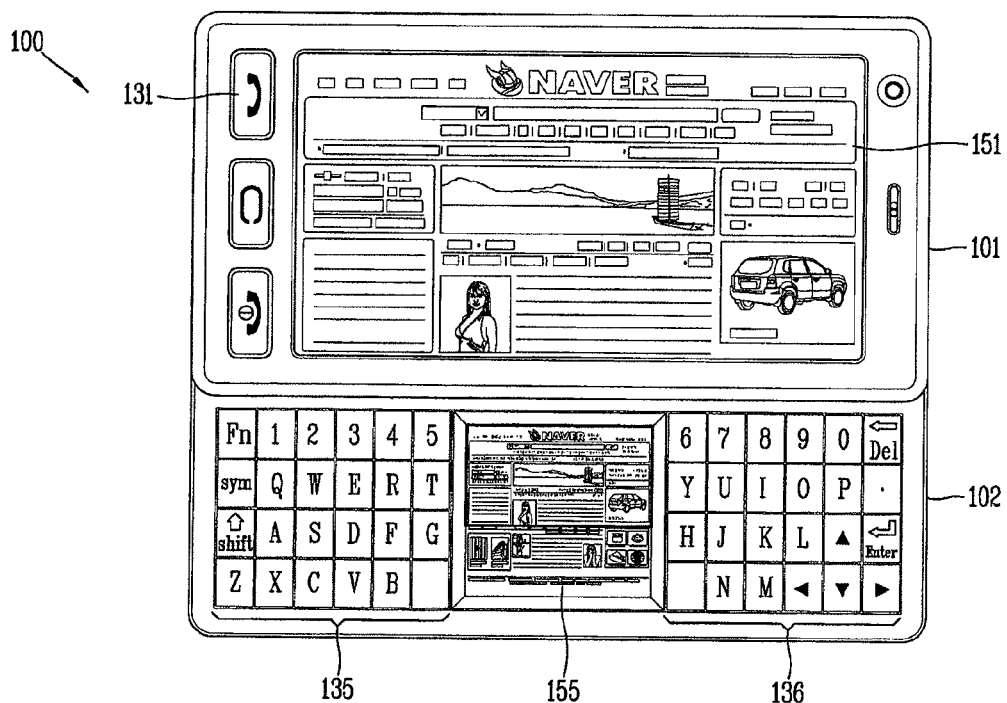

Further, FIG. 30 illustrates that when the user is web browsing on the mobile terminal 100, the first touch screen 151 outputs a current web page while the second touch screen 155 converts the entire image of the web page into a thumbnail image and displays the same and also outputs a mini-map that can be moved by touching the map, thus allowing the user to easily move around the particular portions of the web page. Such a mini-map can additionally include a zooming function.

Figure 31:
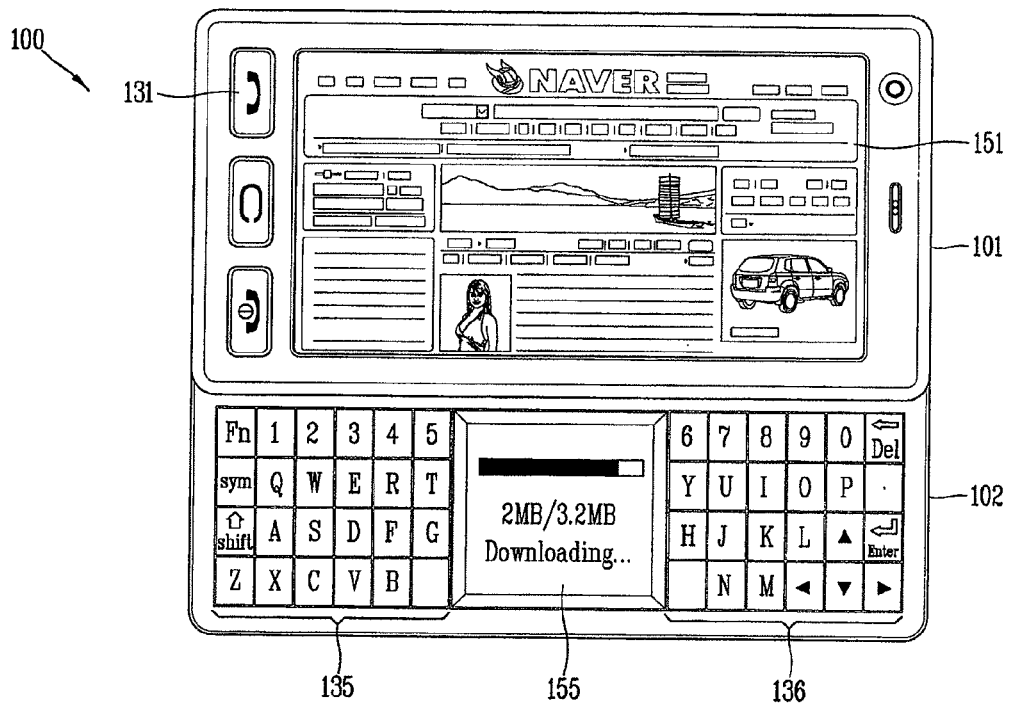
Figure 32:
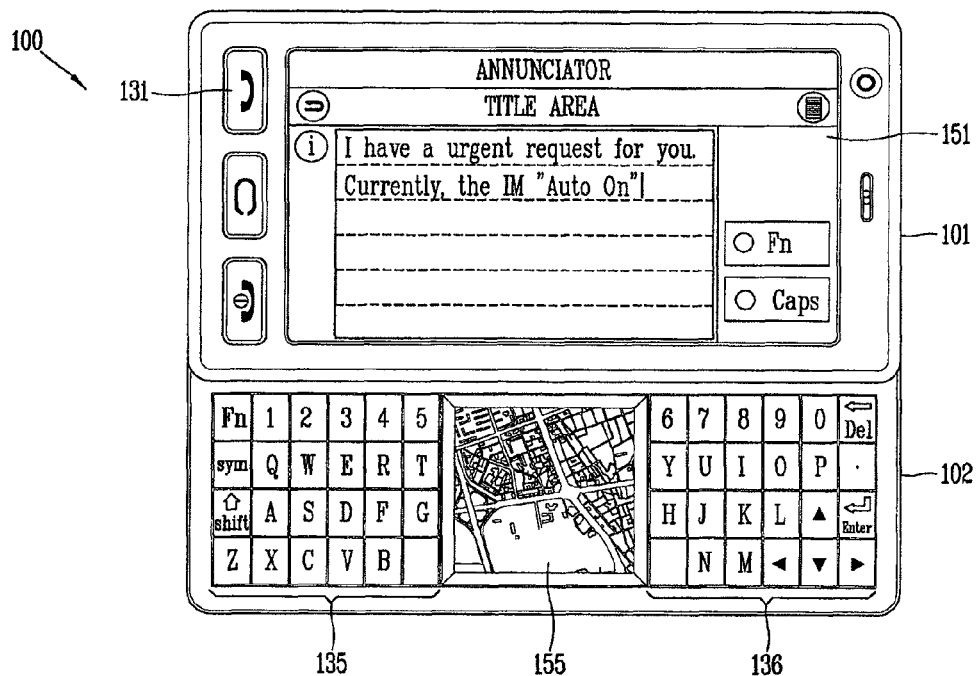

In addition, FIG. 31 illustrates that when the user is web browsing on the mobile terminal, the first touch screen 151 displays a current web page, and the second touch screen 155 displays information about a download/upload state of executed contents. Also, FIG. 32 illustrates that content output on the first touch screen 151 is swapped with the content output on the second touch screen 155.

Namely, when a current map view function and a messaging function are displayed and executed on the first touch screen 151 and the second touch screen 155, respectively, a messaging function is retrieved through a particular touch or a button input to the first touch screen 151, i.e., the main screen, and conversely, the map view is adjusted to be small and output to the second touch screen 155. Also, when two or more modes are being executed, the latest two operations can be switched. Further, when the second touch screen 155 is touched in the state that two independent modes are executed, the operation displayed on the second touch screen 155 may be moved to the first touch screen 151 while the operation displayed on the first touch screen 151 is moved to the second touch screen 151.

Figure 33:
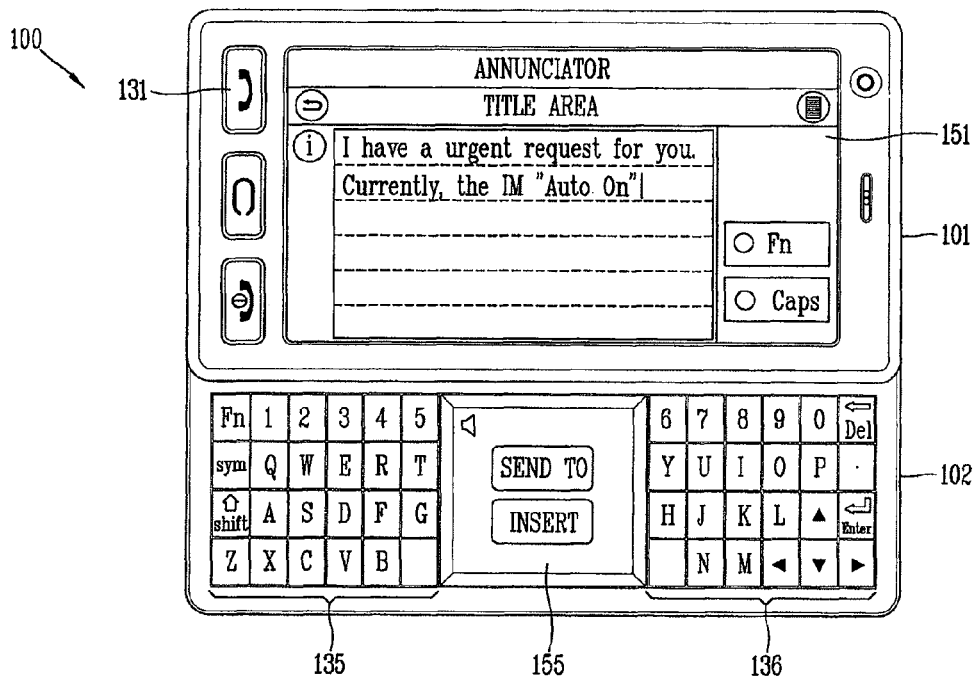

Next, FIG. 33 illustrates the second touch screen 155 displaying icons that can be selected to perform function related to the information displayed in the first touch screen 151. Such display and input method are advantageous in that a preferential function that can be selected in various modes related to a message can be executed through a one-time input, thus significantly simplifying the menu display and selection process and reduce an input time.

Figure 34:
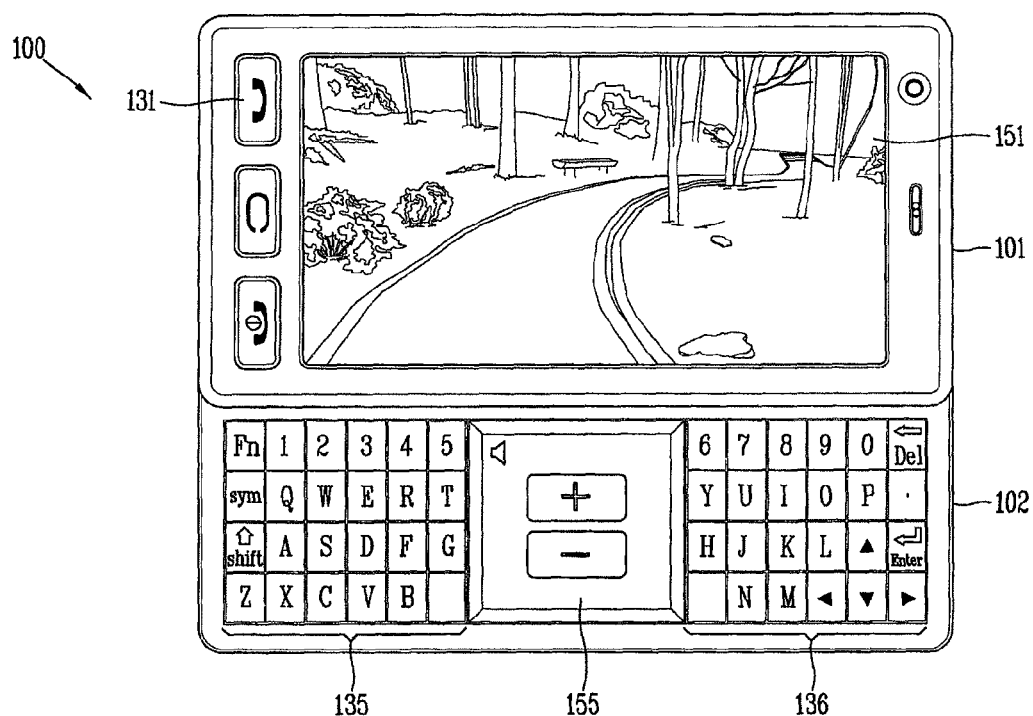
Figure 35:
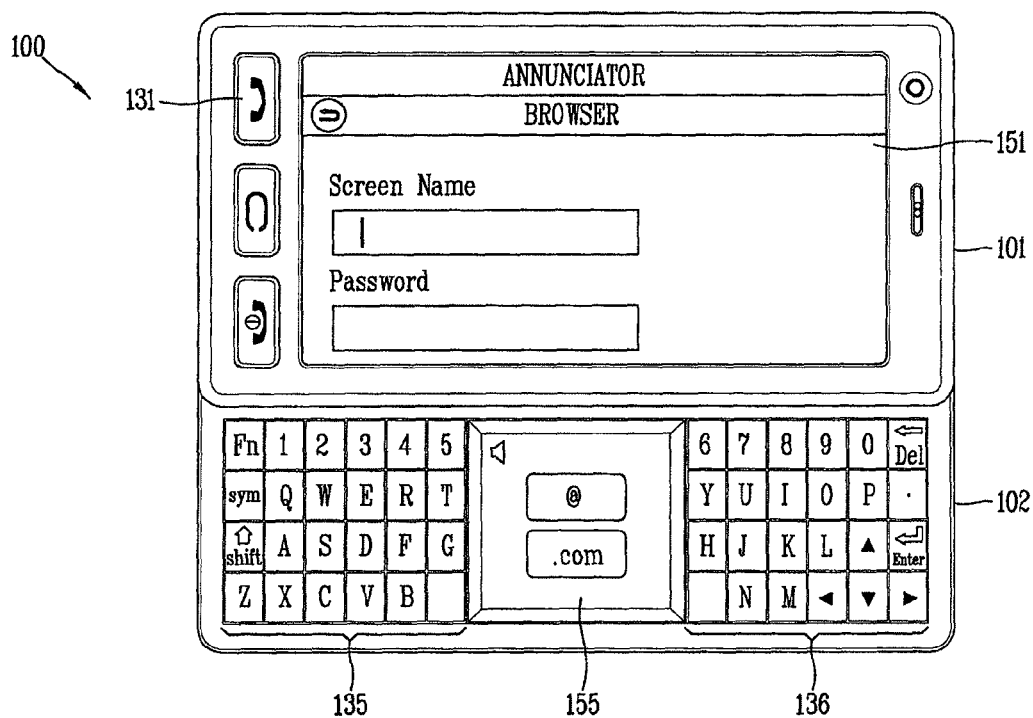
Figure 36:
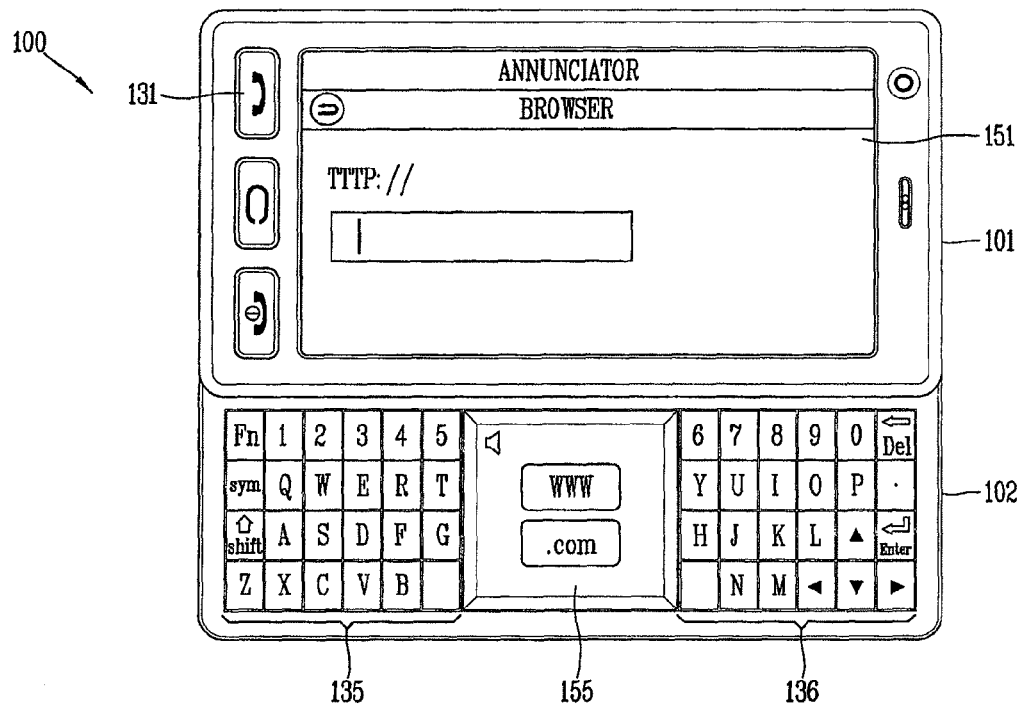
Figure 37:
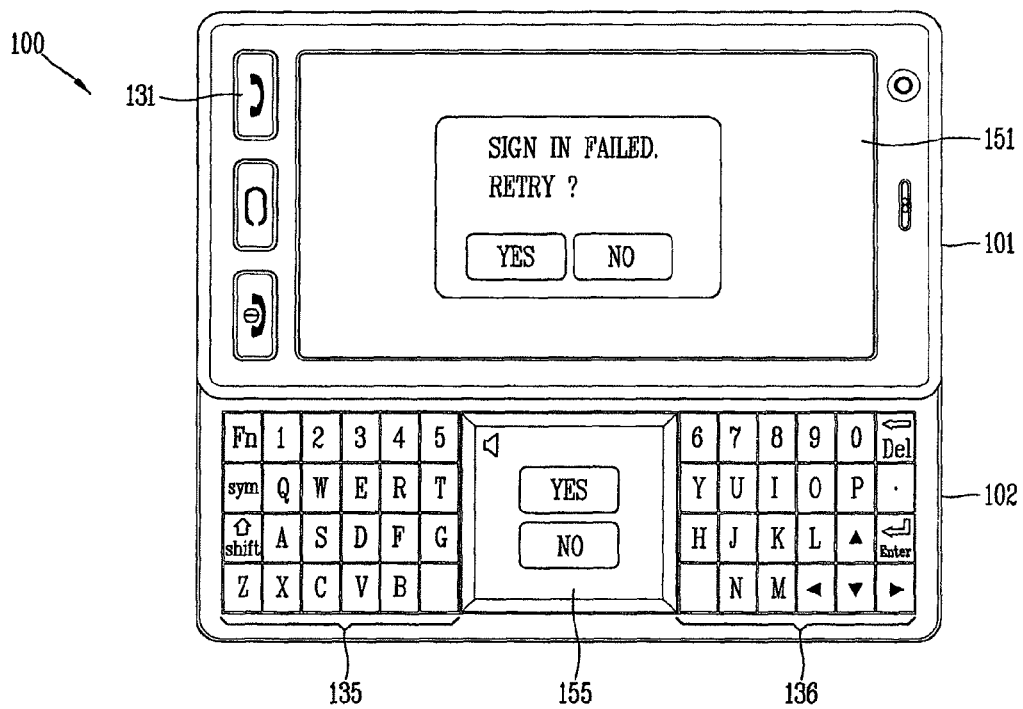

FIG. 34 illustrates the first touch screen 151 outputting multimedia contents and the second touch screen 155 displaying magnified volume icons on the second touch screen 155. Further, FIGS. 35 and 36 illustrate the second touch screen 155 displaying different speed keys that can be input to an e-mail address or web address field displayed on the first touch screen 151. Also, FIG. 37 illustrates that selection with respect to a question window or pop-up to which Yes or No can answer is output also to the second touch screen 155 in such a form that can be input by a touch, thereby shortening the distance along which the user's finger may move or the input time.

As so far described, the mobile terminal according to the embodiments of the present invention has several advantages. That is, because the first touch screen is disposed on the front body and the first and second keypads are disposed on the rear body and the second touch screen is disposed between the first and second keypads, input operations can be quickly and easily performed in an edit mode for messaging or the like. Such disposition also provides an optimum user interface in various modes of the mobile terminal. A mobile terminal having a simpler and thinner external appearance and more convenient user interface through a touch input method is also provided.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
a first body;
a second body slidably coupled with the first body such that the second body is slidably moved in a widthwise direction to implement an opened and closed configuration with respect to the first body;
first and second keypads disposed separately on a front surface of the second body;
a display disposed on a front surface of the first body and configured to display content input through manipulation of the first or second keypads; and
a touch screen disposed between the first and second keypads and configured to display information that can be selected and displayed on the display and that is not included on the first or second keypads, and to display a magnified version of content recently input on the display when a plurality of contents are continuously input through the manipulation of the first or second keypads; and
a controller configured to:
execute a first mode and display first visual information related to the executing first mode on the display,
execute a second mode and display second visual information related to the executing second mode on the touch screen,
receive a touch input applied to the display while the first and second modes are executed, and
switch displaying the first and second visual information such that the first visual information is reduced in size and displayed on the touch screen and the second visual information is displayed on the display in response to the received touch input.

2. The mobile terminal of claim 1, wherein the information displayed on the touch screen comprises at least one of numbers, special symbols and emoticons not included on the first and second keypads.

3. The mobile terminal of claim 1, wherein the information displayed on the touch screen comprises navigational keys for navigating the content displayed on the display.

4. The mobile terminal of claim 3, wherein the content displayed on the display comprises a web page and the navigational keys comprises directional keys to scroll through information displayed on the web page and an OK button configured to select a link included on the web page.

5. The mobile terminal of claim 1, wherein the information displayed on the touch screen comprises a list of favorite items that can be scrolled through, and
wherein the touch screen is further configured to enlarge a currently selected favorite item.

6. The mobile terminal of claim 5, wherein the list of favorite items are arranged in a circular pattern that can be rotated through by selecting a forward or reverse button.

7. The mobile terminal of claim 1, wherein the information displayed on the touch screen comprises information about an incoming email or an incoming phone call.

8. The mobile terminal of claim 1, wherein the content displayed on the display includes a list of items, and
wherein the information displayed on the touch screen includes sub-items included in a selected item of the list of items.

9. The mobile terminal of claim 1, wherein the content displayed on the display includes chatting messages performed during a chatting session, and
wherein the information displayed on the touch screen includes a new chatting message to be displayed in the chatting messages displayed on the display.

10. The mobile terminal of claim 1, wherein the information displayed on the touch screen includes a list of possible words including at least a portion corresponding to content recently input on the display.

11. The mobile terminal of claim 1, wherein the first and second keypads include all letters in a QWERTY keyboard and the touch screen includes all numbers in the QWERTY keyboard so as to form a complete QWERTY keyboard.

12. The mobile terminal of claim 1, wherein the first and second keypads include all letters and numbers in a QWERTY keyboard and the touch screen includes at least one of special symbols and emoticons such that the touch screen serves as an extended input unit with the first and second keypads.

13. The mobile terminal of claim 1, wherein the first and second keypads are linked with the touch screen such that contents can be input to the display using any combination of the first keypad, the second keypad and the touch screen.

14. The mobile terminal of claim 1, wherein the display is also a touch screen.

15. The mobile terminal of claim 1, wherein the contents displayed in the display include email information, and
wherein the information displayed on the touch screen comprises at least one of an "@" sign and a ".com" sign that can be selected to facilitate entering an email information in the display.

16. The mobile terminal of claim 1, wherein the contents displayed in the display include web browser entry field for accessing a particular web page, and
wherein the information displayed on the touch screen comprises at least one of a "www" sign and a ".com" sign that can be selected to facilitate entering the particular web page in the web browser entry field displayed in the display.

17. The mobile terminal of claim 1, wherein the contents displayed in the display include a currently viewed web page, and
wherein the information displayed in the touch screen includes a web address of the currently viewed web page such that if the currently viewed web page displayed in the display freezes, the web address of the currently viewed web page can be selected in the touch screen to re-access the web page.

18. The mobile terminal of claim 1, wherein the first and second keypads and the touch screen are automatically activated when the first and second bodies are slid open into the open configuration.

19. The mobile terminal of claim 1, wherein the display is disposed above the touch screen and the first and second keypads and extends across the touch screen and at least partially across the first and second keypads.

* * * * *